(12) United States Patent
Bambara et al.

(10) Patent No.: US 6,167,790 B1
(45) Date of Patent: Jan. 2, 2001

(54) LAMINATED FOAM STRUCTURES WITH ENHANCED PROPERTIES

(75) Inventors: John D. Bambara, Osterville, MA (US); Richard Bambara, Cooperstown, NY (US); Scott C. Smith, Osterville, MA (US); Thomas W. Smith, Austin, TX (US)

(73) Assignee: Sentinel Products Corp., Hyannis, MA (US)

( * ) Notice: Under 35 U.S.C. 154(b), the term of this patent shall be extended for 0 days.

(21) Appl. No.: 09/167,200

(22) Filed: Oct. 6, 1998

Related U.S. Application Data

(60) Division of application No. 08/706,722, filed on Sep. 6, 1996, now Pat. No. 5,876,813, which is a continuation-in-part of application No. 08/678,513, filed on Jul. 9, 1996, now Pat. No. 5,882,776.

(51) Int. Cl.$^7$ ........................................ B26D 1/00
(52) U.S. Cl. .................... 83/13; 83/39; 83/861; 83/879
(58) Field of Search ................ 83/13, 39, 861, 83/879; 428/304.4, 215; 206/521, 320, 523

(56) References Cited

U.S. PATENT DOCUMENTS

| | | |
|---|---|---|
| 1,288,132 * | 12/1918 | Nagle ................................ 83/880 X |
| 2,254,203 | 9/1941 | Bender . |
| 2,387,730 | 10/1945 | Alderson . |
| 2,450,436 | 10/1948 | McIntire . |
| 2,515,250 | 7/1950 | McIntire . |
| 2,740,157 | 4/1956 | McCurdy et al. . |
| 2,988,777 | 6/1961 | Bieber et al. . |
| 3,067,147 | 12/1962 | Rubens et al. . |
| 3,098,831 | 7/1963 | Carr . |
| 3,098,832 | 7/1963 | Pooley et al. . |
| 3,238,565 | 3/1966 | Jacobs . |

(List continued on next page.)

FOREIGN PATENT DOCUMENTS

| | | |
|---|---|---|
| 0 702 032 A2 | 3/1996 | (EP) . |
| WO 90/03414 | 4/1990 | (WO) . |
| WO 92/14784 | 9/1992 | (WO) . |
| WO 93/03093 | 2/1993 | (WO) . |

OTHER PUBLICATIONS

Ultsch & Fritz, "Crosslinking of LLDPE and VLDPE via graft–polymerized vinyltrimethoxysilane" *Rubber Processing and Applications*, 13:81–91, 1990.

Crawford, Plastics Engineering, 2nd Edition, Department of Mechanical, Aeronautical and Manufacturing Engineering, The Queen's University of Belfast, UK, Pergamon Press, New York 1987 pp. 48–57.

Handbook of Polymeric Foams and Foam Technology, edited by Daniel Klempner and Kurt C. Frisch, Hanser Publishers, New York 1991.

Thermoplastic Foams, James L. Throne, Sherwood Technologies, Inc., Sherwood Publishers, Hinckley, Ohio 1996.

*Primary Examiner*—M. Rachuba
(74) *Attorney, Agent, or Firm*—Fish & Richardson P.C.

(57) ABSTRACT

The invention relates to foam structures with enhanced physical properties which can be used in the areas of packaging, athletics, water sports, and construction. In general, the structures are laminated polymer foams that include a core of a low density foam and one or more skins of relatively high density foam covering the core. The skins provide improved physical properties to the foam structures by improving the flexural strength, resistance to bending, and resulting damage from bending in the laminated foam structure while modestly increasing the weight of the laminated structure, for example. Uses of the foam structures include, but are not limited to, packaging materials, gym mats, body boards, or eaves fillers. The skin can act as a hinge to fold a die cut piece into a collapsible packaging system.

11 Claims, 12 Drawing Sheets

U.S. PATENT DOCUMENTS

| | | | |
|---|---|---|---|
| 3,287,477 | 11/1966 | Vesilind . | |
| 3,292,513 | * 12/1966 | Palmer | 83/880 X |
| 3,335,892 | 8/1967 | Hildreth . | |
| 3,338,864 | 8/1967 | Megall et al. . | |
| 3,344,973 | * 10/1967 | Studen | 206/523 |
| 3,346,686 | 10/1967 | Collins . | |
| 3,379,802 | 4/1968 | Raley . | |
| 3,396,062 | 8/1968 | White . | |
| 3,399,098 | 8/1968 | Omoto et al. . | |
| 3,413,387 | 11/1968 | Ohsol . | |
| 3,413,388 | 11/1968 | Lux et al. . | |
| 3,431,163 | 3/1969 | Gilbert . | |
| 3,565,243 | 2/1971 | Freeman . | |
| 3,639,304 | 2/1972 | Raley, Jr. . | |
| 3,644,230 | 2/1972 | Cronin . | |
| 3,645,155 | 2/1972 | Robinson . | |
| 3,645,992 | 2/1972 | Elston . | |
| 3,646,155 | 2/1972 | Scott . | |
| 3,651,183 | 3/1972 | Hosoda et al. . | |
| 3,711,584 | 1/1973 | Sagane et al. . | |
| 3,743,611 | 7/1973 | Muroi et al. . | |
| 3,755,208 | 8/1973 | Ehrenfreund . | |
| 3,804,684 | 4/1974 | Tokushige et al. . | |
| 3,808,300 | 4/1974 | Miyamoto et al. . | |
| 3,814,779 | 6/1974 | Wiley . | |
| 3,854,650 | 12/1974 | Hanaue . | |
| 3,886,100 | 5/1975 | Yasuda et al. . | |
| 3,936,518 | 2/1976 | Soda et al. . | |
| 3,938,661 | 2/1976 | Carmody . | |
| 3,949,028 | 4/1976 | Murakami et al. . | |
| 3,953,558 | 4/1976 | Hatano et al. . | |
| 3,954,929 | 5/1976 | Hoenke . | |
| 3,959,189 | 5/1976 | Kitamori . | |
| 3,960,784 | 6/1976 | Rubens . | |
| 3,964,354 | * 6/1976 | Johannsen | 83/39 |
| 3,965,054 | 6/1976 | Nojiri et al. . | |
| 3,966,381 | 6/1976 | Suh . | |
| 3,976,530 | 8/1976 | Callan . | |
| 3,996,171 | 12/1976 | Holland et al. . | |
| 4,048,275 | 9/1977 | Usamoto et al. . | |
| 4,053,341 | 10/1977 | Kleiner et al. . | |
| 4,058,583 | 11/1977 | Glander et al. . | |
| 4,062,712 | 12/1977 | Stark . | |
| 4,076,698 | 2/1978 | Anderson et al. . | |
| 4,080,344 | 3/1978 | Ikeda et al. . | |
| 4,089,818 | 5/1978 | Slocumb . | |
| 4,102,720 | 7/1978 | Kaneko et al. . | |
| 4,102,829 | 7/1978 | Watanabe et al. . | |
| 4,110,269 | 8/1978 | Ehrenfruend . | |
| 4,117,195 | 9/1978 | Swarbrick et al. . | |
| 4,126,598 | 11/1978 | Reighter . | |
| 4,142,956 | 3/1979 | Shikinami et al. . | |
| 4,146,598 | 3/1979 | Coyne . | |
| 4,157,413 | * 6/1979 | Ruhl | 428/159 |
| 4,163,085 | 7/1979 | Kuhnel et al. . | |
| 4,168,353 | 9/1979 | Kitamori . | |
| 4,181,647 | 1/1980 | Beach . | |
| 4,181,762 | 1/1980 | Benedyk . | |
| 4,182,398 | 1/1980 | Salyer et al. . | |
| 4,203,815 | 5/1980 | Noda et al. . | |
| 4,209,473 | 6/1980 | Coyne . | |
| 4,211,590 | 7/1980 | Steward et al. . | |
| 4,215,202 | 7/1980 | Park . | |
| 4,225,650 | 9/1980 | van Brederode et al. . | |
| 4,226,946 | 10/1980 | Park et al. . | |
| 4,228,255 | 10/1980 | Fujimoto et al. . | |
| 4,234,531 | 11/1980 | Jocteur . | |
| 4,241,832 | 12/1980 | Bliss . | |
| 4,247,651 | 1/1981 | Ohno et al. . | |
| 4,275,023 | 6/1981 | Shimizu et al. . | |
| 4,292,106 | 9/1981 | Herschdorfer et al. . | |
| 4,303,756 | 12/1981 | Kajimura et al. . | |
| 4,303,757 | 12/1981 | Kajimura et al. . | |
| 4,308,352 | 12/1981 | Knaus . | |
| 4,333,898 | 6/1982 | Schmidtchen . | |
| 4,337,321 | 6/1982 | Allada . | |
| 4,347,329 | 8/1982 | Park . | |
| 4,370,378 | 1/1983 | Zabrocki et al. . | |
| 4,379,859 | 4/1983 | Hirosawa et al. . | |
| 4,389,514 | 6/1983 | Schmidle et al. . | |
| 4,395,459 | 7/1983 | Herschdorfer et al. . | |
| 4,399,087 | 8/1983 | Akiyama et al. . | |
| 4,429,059 | 1/1984 | Ozutsumi et al. . | |
| 4,433,029 | 2/1984 | Senda et al. . | |
| 4,440,703 | 4/1984 | Akiyama et al. . | |
| 4,443,393 | 4/1984 | Akiyama et al. . | |
| 4,444,948 | 4/1984 | Hochstrasser . | |
| 4,446,254 | 5/1984 | Nakae et al. . | |
| 4,448,901 | 5/1984 | Senda et al. . | |
| 4,464,425 | 8/1984 | Voigt et al. . | |
| 4,473,665 | 9/1984 | Martini-Vvedensky et al. . | |
| 4,504,534 | 3/1985 | Adachi et al. . | |
| 4,510,031 | 4/1985 | Matsumura et al. . | |
| 4,515,907 | 5/1985 | McCullough et al. . | |
| 4,526,930 | 7/1985 | Keogh . | |
| 4,542,164 | 9/1985 | Nishioka et al. . | |
| 4,554,293 | 11/1985 | Park . | |
| 4,574,101 | 3/1986 | Tricca et al. . | |
| 4,581,383 | 4/1986 | Park . | |
| 4,591,606 | 5/1986 | Bergström . | |
| 4,592,468 | 6/1986 | Wallace . | |
| 4,605,682 | 8/1986 | Park . | |
| 4,633,361 | 12/1986 | Ela et al. . | |
| 4,640,933 | 2/1987 | Park . | |
| 4,652,588 | 3/1987 | Park . | |
| 4,662,851 | 5/1987 | Foster . | |
| 4,663,361 | 5/1987 | Park . | |
| 4,666,946 | 5/1987 | Fudge . | |
| 4,692,471 | 9/1987 | Fudge . | |
| 4,694,025 | 9/1987 | Park . | |
| 4,694,027 | 9/1987 | Park . | |
| 4,702,868 | 10/1987 | Pontiff et al. . | |
| 4,709,817 | 12/1987 | Keady et al. . | |
| 4,714,716 | 12/1987 | Park . | |
| 4,725,492 | 2/1988 | Yazaki et al. . | |
| 4,739,547 | 4/1988 | Tanaka et al. . | |
| 4,758,299 | * 7/1988 | Burke | 428/316.6 X |
| 4,759,992 | 7/1988 | Tomko et al. . | |
| 4,762,860 | 8/1988 | Park . | |
| 4,791,143 | 12/1988 | Tanaka et al. . | |
| 4,791,147 | 12/1988 | Tanaka et al. . | |
| 4,824,059 | 4/1989 | Butler . | |
| 4,828,897 | * 5/1989 | Staneluis et al. | 428/71 |
| 4,837,272 | 6/1989 | Kelley . | |
| 4,840,277 | 6/1989 | Waldner . | |
| 4,850,913 | * 7/1989 | Szabad, Jr. | 441/65 |
| 4,868,044 | 9/1989 | Tanaka et al. . | |
| 4,870,111 | 9/1989 | Donuiff et al. . | |
| 4,873,042 | 10/1989 | Topcik . | |
| 4,885,820 | 12/1989 | Erceg et al. . | |
| 4,900,490 | 2/1990 | Kozma . | |
| 4,908,166 | 3/1990 | Salyer . | |
| 4,918,111 | 4/1990 | Tanaka et al. . | |
| 4,919,864 | 4/1990 | Knaus . | |
| 4,921,563 | * 5/1990 | Schwertner et al. | 83/862 X |
| 4,937,284 | 6/1990 | Bergstrom . | |

| | | |
|---|---|---|
| 4,937,299 | 6/1990 | Ewen et al. . |
| 4,940,632 | 7/1990 | Nicola et al. . |
| 4,953,705 * | 9/1990 | Evamy .............................. 206/523 X |
| 4,958,770 | 9/1990 | Mitchell . |
| 4,960,830 | 10/1990 | Hazelton et al. . |
| 5,026,736 | 6/1991 | Pontiff . |
| 5,047,476 | 9/1991 | Keogh . |
| 5,051,293 * | 9/1991 | Breitscheidel et al. .............. 428/157 |
| 5,053,446 | 10/1991 | Salyer . |
| 5,064,802 | 11/1991 | Stevens et al. . |
| 5,064,903 | 11/1991 | Peiffer . |
| 5,086,121 | 2/1992 | Hazelton et al. . |
| 5,091,436 | 2/1992 | Frisch et al. . |
| 5,093,206 | 3/1992 | Schoenbeck . |
| 5,098,778 | 3/1992 | Minnick . |
| 5,112,919 | 5/1992 | Furrer et al. . |
| 5,132,380 | 7/1992 | Stevens et al. . |
| 5,149,574 | 9/1992 | Gross et al. . |
| 5,151,204 | 9/1992 | Struglinski . |
| 5,186,851 | 2/1993 | Gutierrez et al. . |
| 5,206,075 | 4/1993 | Hodgson, Jr. . |
| 5,210,150 | 5/1993 | Prejean . |
| 5,224,890 * | 7/1993 | Moran .................................... 441/65 |
| 5,225,254 * | 7/1993 | Foulke ................................... 428/12 |
| 5,226,557 * | 7/1993 | Nelson .............................. 428/71 X |
| 5,246,783 | 9/1993 | Spenadel et al. . |
| 5,268,115 | 12/1993 | Gutierrez et al. . |
| 5,272,236 | 12/1993 | Lai et al. . |
| 5,275,747 | 1/1994 | Gutierrez et al. . |
| 5,277,833 | 1/1994 | Song et al. . |
| 5,278,264 | 1/1994 | Spaleck et al. . |
| 5,278,272 | 1/1994 | Lai et al. . |
| 5,288,762 | 2/1994 | Park et al. . |
| 5,304,580 | 4/1994 | Shibayama et al. . |
| 5,318,649 | 6/1994 | Nishino et al. . |
| 5,322,181 * | 6/1994 | Nelson ................................. 220/461 |
| 5,322,728 | 6/1994 | Davey et al. . |
| 5,329,033 | 7/1994 | Spaleck et al. . |
| 5,340,840 | 8/1994 | Park et al. . |
| 5,345,002 | 9/1994 | Song et al. . |
| 5,350,817 | 9/1994 | Winter et al. . |
| 5,366,647 | 11/1994 | Gutierrez et al. . |
| 5,369,136 | 11/1994 | Park et al. . |
| 5,370,229 | 12/1994 | Kroeckel et al. . |
| 5,376,428 | 12/1994 | Palazzoto et al. . |
| 5,380,810 | 1/1995 | Lai et al. . |
| 5,382,698 | 1/1995 | Song et al. . |
| 5,385,972 | 1/1995 | Yamamoto et al. . |
| 5,387,620 | 2/1995 | Park et al. . |
| 5,391,629 | 2/1995 | Turner et al. . |
| 5,395,580 | 3/1995 | Morita et al. . |
| 5,407,965 | 4/1995 | Park et al. . |
| 5,408,004 | 4/1995 | Lai et al. . |
| 5,461,110 | 10/1995 | Arthurs et al. . |
| 5,589,519 | 12/1996 | Knaus . |
| 5,604,033 | 2/1997 | Arthurs et al. . |
| 5,604,288 | 2/1997 | Furukawa et al. . |
| 5,612,510 | 3/1997 | Hildreth . |

* cited by examiner

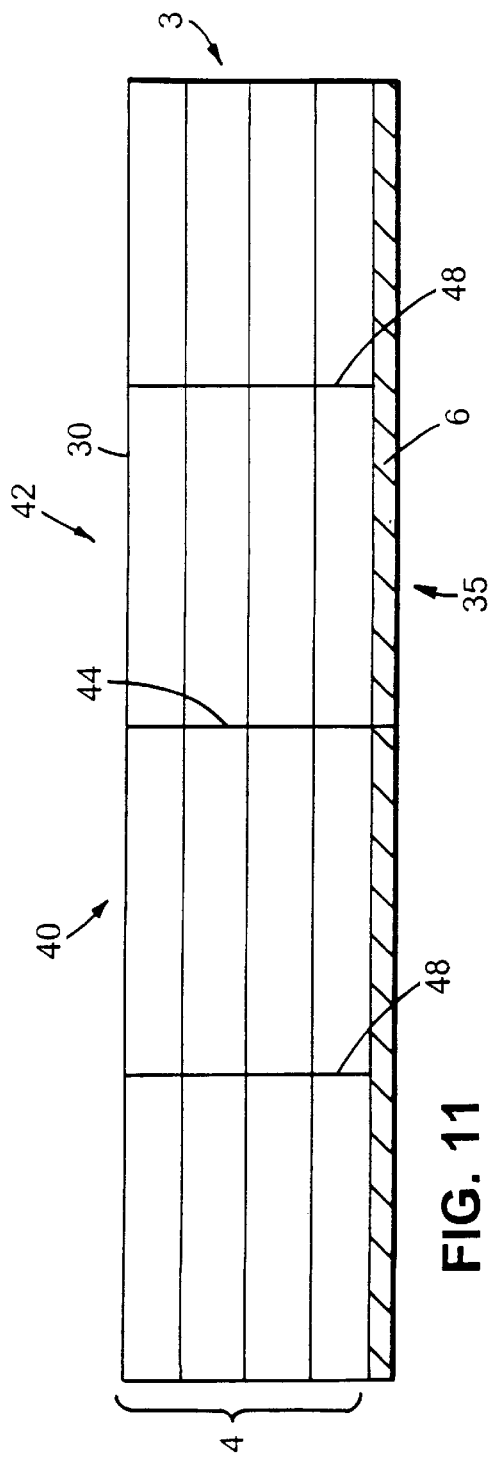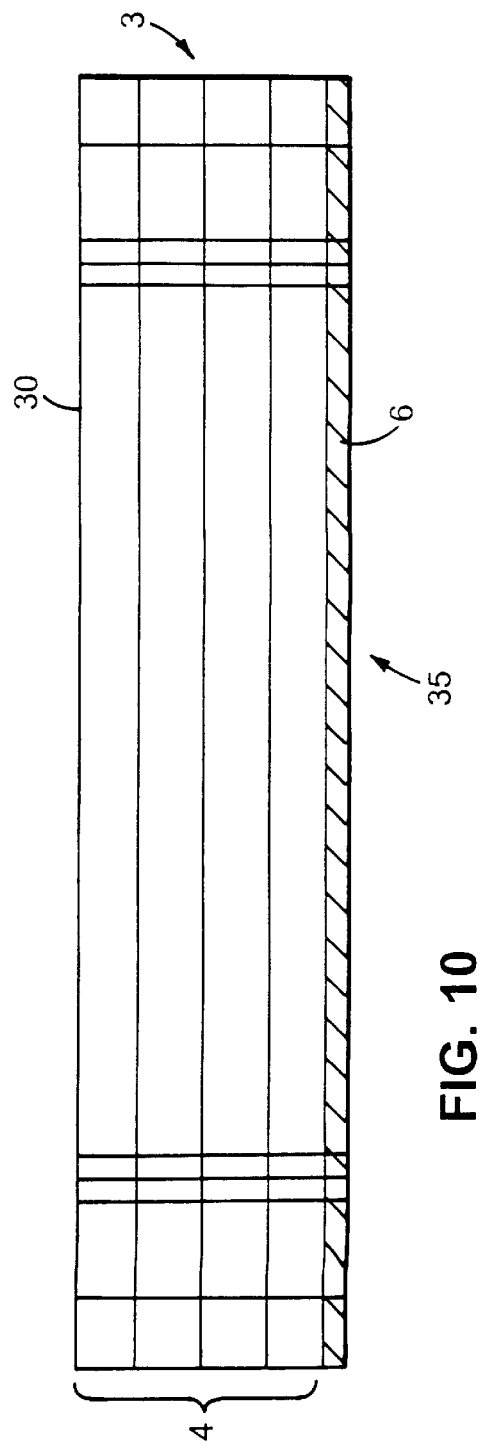

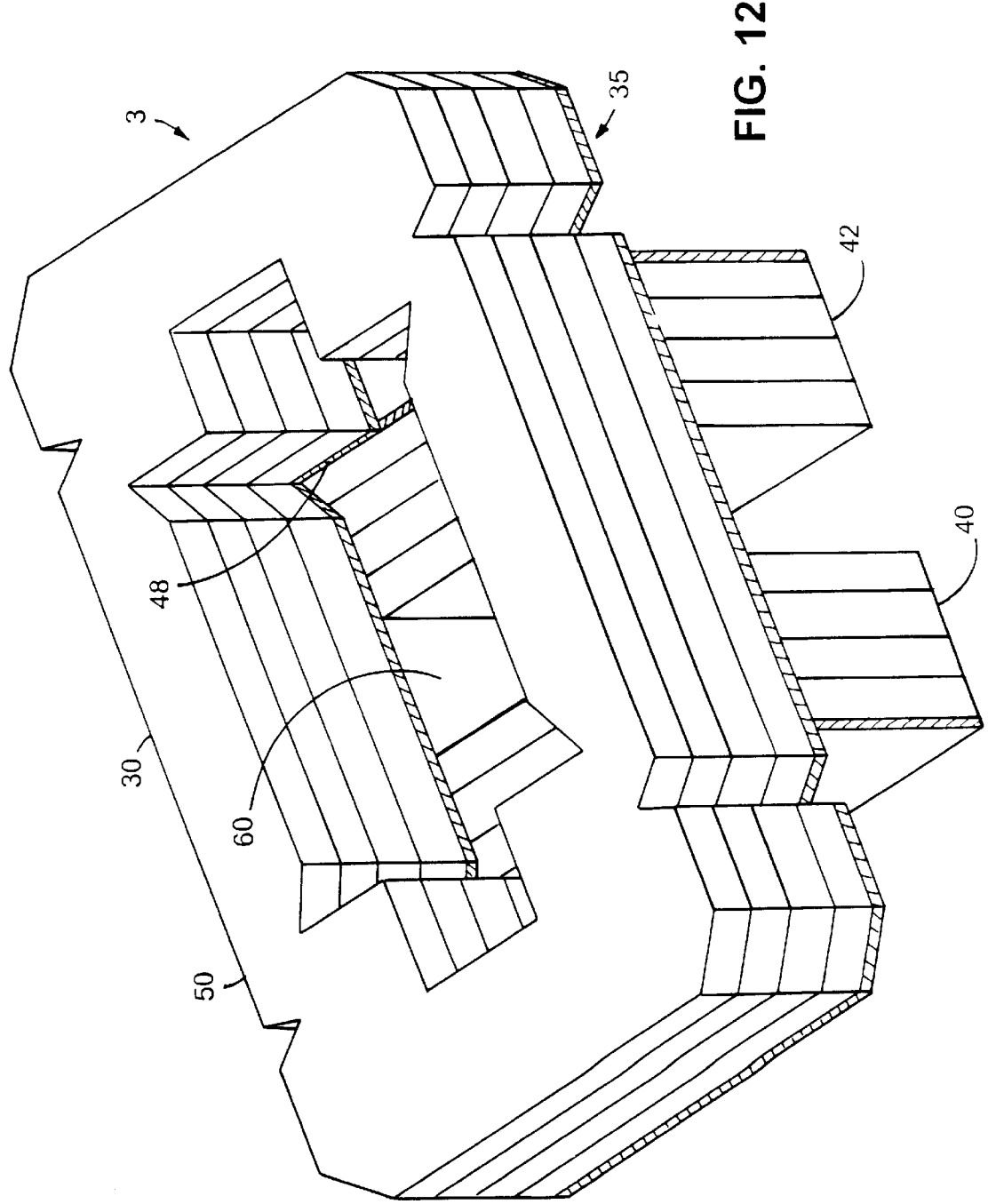

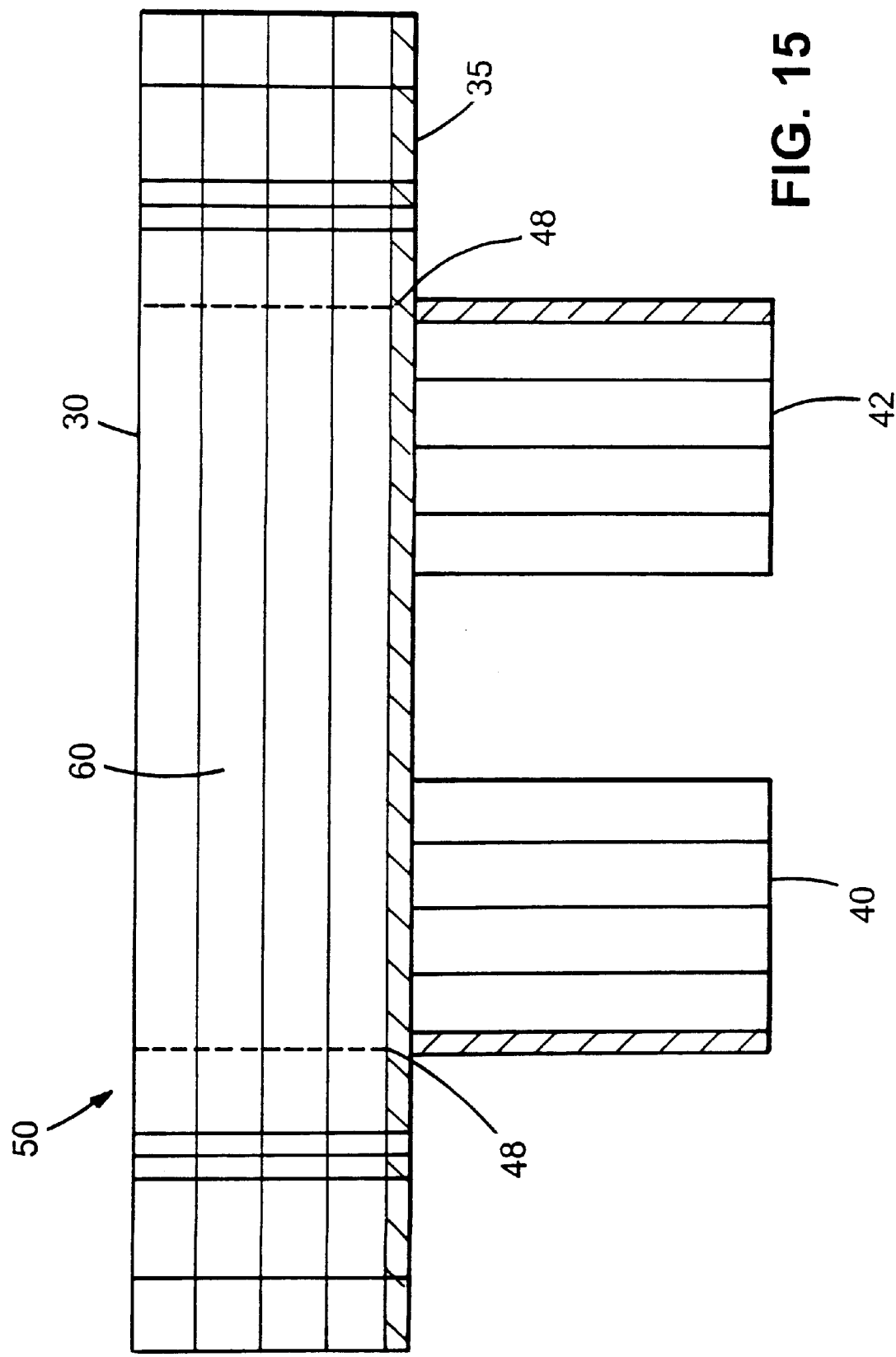

LAMINATED FOAM STRUCTURES WITH ENHANCED PROPERTIES

CROSS-REFERENCE TO RELATED APPLICATION

This application is a divisional of U.S. Ser. No. 08/706,722, filed Sep. 6, 1996, now U.S. Pat. No. 5,876,813 which is a continuation-in-part of U.S. Ser. No. 08/678,513, filed Jul. 9, 1996 now U.S. Pat. No. 5,882,776. Each of the above applications and any patents issuing on them are hereby incorporated by reference.

BACKGROUND OF THE INVENTION

The invention relates to polymer foams. In particular, the invention relates to polymer foams having low densities with enhanced physical properties.

Foam structures are useful in the areas of packaging, athletics, water sports, and construction. In general, the foams are low density polymeric materials with good physical properties that are capable of supporting loads without adverse deformation. In general, the physical properties required by these applications suggest the use of high density foams. It is generally required that the foams have good proportional limit, compressive properties, shear properties, fatigue properties, and buckling limits, as defined, for example, in "Machinery's Handbook," E. Oberg, et al., Green, Ed., Industrial Press Inc., New York, 1992, pages 166, 168 and 253.

Physically-blown foams, particularly foams with enhanced physical properties are useful, for example, in packaging, automotive, construction, contact sports, water sports, exercise, and appliance applications. It is important to maintain good foam properties (e.g., cushioning and resistance to creasing) at low foam densities.

Packaging design has focused on the use of systems such as end caps which fit on opposite ends of the packaged product (e.g., televisions, computers, and electronic equipment, or high value artifacts such as glass vases or fragile art work) and suspend the product in the center of a container during shipping and storage. Previous suspension-type packaging systems have been composed of corrugated or paperboard materials, molded low density foams such as polystyrene, protective films or sheeting, wood, plastic, organic or inorganic fill, or combinations of the above materials that are glued together. Molded packaging materials, such as styrofoam end caps, are bulky to transport and store. It is most desirable for the structure to provide the required packaging protection with the lowest amount of added weight.

SUMMARY OF THE INVENTION

The invention features foam structures that are laminated and have enhanced physical properties, making them useful in the areas of packaging, athletics, water sports, and construction. In general, these structures include a core of a low density foam and one or more skins of relatively high density foam covering the core. The skins provide improved physical properties to the foam structures by, for example, improving the flexural strength, resistance to bending (or crimping), and resulting damage from bending in the laminated foam structure. The foam structures have improved stiffness, resist creasing, and more effectively dissipate loading forces of the foam. The outer surface of the foam structures is smooth and flat relative to the surface of the low density case. The low density core provides a relatively low-weight product that uses relatively small amounts of polymer material. The laminated foam structure can be die cut so that the skin of higher density foam on the outside of the structure can act as a hinge allowing the die cut piece to be folded to make a collapsible packaging system. Examples of physically-blown foams are described in U.S. Ser. No. 08/638,122, filed Apr. 26, 1996 and entitled "Cross-Linked Low-Density Polymer Foam", which is incorporated herein by reference.

In one aspect, the invention features a laminated foam structure that includes a first foam article laminated to a first surface of a second foam article and a third foam article laminated to a second surface of the second foam article. The first foam article and the third foam article each have an average foam density that is at least 1.5 times greater than the average foam density of the second foam article and a volume that is at least 1.5 times smaller than the second foam article. The flexural stiffness of the laminated foam structure is 2–20 times higher than the flexural stiffness of the second foam article. Flexural stiffness can be determined directly from beam bending tests.

In preferred embodiments, the second foam article is a laminated foam article including at least two foams. Each of the two foams have an average foam density of less than 4 pounds per cubic foot. Preferably, each of the two foams has a thickness between about ¼ and 1 inches. It is preferred that the first foam article and the third foam article each have an average foam density of between about 4 and 15 pounds per cubic foot. Preferably, each of the first foam article and the third foam article has a thickness between about 1/16 and 5/16 inches.

Preferably, the second foam article has an average foam density of between 1 and 3 pounds per cubic foot, the first foam article has an average foam density of between about 4 and 12 pounds per cubic foot, and the third foam article has an average foam density of between about 4 and 12 pounds per cubic foot. The first foam article and the third foam article each can be laminated foam articles including two foams each having an average foam density of greater than 4 pounds per cubic foot.

In preferred embodiments, the second foam article can further include a foam layer having an average foam density greater than about 4 pounds per cubic foot. Preferably, the foam layer has an average foam density between 4 and 15 pounds per cubic foot and a thickness between about 1/16 and ½ inches.

In preferred embodiments, the structure has a total thickness between about ¾ and 12 inches.

In another aspect, the invention features a laminated foam structure including a first skin laminated to a first surface of a core, and a second skin laminated to a second surface of the core. The core includes a first foam having an average foam density of between about 1 and 4 pounds per cubic foot, the first skin includes a second foam and the second skin includes a third foam each having an average foam density of between about 4 and 15 pounds per cubic foot and a thickness less than ½ inches, and the laminated foam structure has a total thickness of less than about 12 inches. The flexural stiffness of the laminated foam structure is 2–20 times higher than the flexural stiffness of the core.

In yet another aspect, the invention features a body board that includes a laminated foam structure. The laminated foam structure includes a first skin laminated to a first surface of a core, and a second skin laminated to a second surface of the core. The core includes a first foam having an average foam density of between about 1 and 4 pounds per cubic foot, the first skin includes a second foam and the second skin includes a third foam each having an average foam density of between about 4 and 15 pounds per cubic foot and a thickness less than ½ inches, and the laminated foam structure has a total thickness of less than about 3 inches. The higher densities of the first and second skins can make the structure more resistant to mechanical damage from impact, shear, and abrasive loads due to the higher polymer and lower air content of the higher density foam.

In preferred embodiments, the first foam includes at least two laminated foam articles. The second foam can include at least two laminated foam articles or the third foam can include at least two laminated foam articles. Preferably, each of the foam articles has an average foam density of between 1 and 4 pounds per cubic foot and a thickness of between ¼ and 1 inches. It is preferred that the first foam further include a foam layer having an average foam density greater than about 4 pounds per cubic foot and a thickness less than ½ inch.

In another aspect, the invention features a method of increasing the flexural strength of a core foam structure including the steps of laminating a first skin to a first surface of the structure, and laminating a second skin to a second surface of the core foam structure. The first skin includes a first foam having an average density that is at least 1.5 times greater than the average density of the core foam structure and a thickness that is at least 1.5 times smaller than the thickness of the core foam structure. The second skin includes a second foam having an average density that is at least 1.5 times greater than the average density of the core foam structure and a thickness that is at least 1.5 times smaller than the thickness of the core foam structure.

In preferred embodiments, the core foam structure is a laminated foam article including at least two foams each having an average foam density of less than 4 pounds per cubic foot. In other preferred embodiments, the first skin and the second skin each have an average foam density of between about 4 and 15 pounds per cubic foot. Preferably, the core foam structure has an average foam density of between 1 and 3 pounds per cubic foot, the first skin has an average foam density of between about 4 and 12 pounds per cubic foot, and the second skin has an average foam density of between about 4 and 12 pounds per cubic foot. The first skin and the second skin each can be laminated foam articles including two foams each having an average foam density of greater than 4 pounds per cubic foot.

In other preferred embodiments, the method further includes the step of including a foam layer having an average foam density greater than about 4 pounds per cubic foot in the core foam structure.

In other preferred embodiments, the foam includes a polyolefin. The polyolefin includes a polyethylene or polypropylene. Preferably, the foam further includes a single-site initiated polyolefin resin. In preferred embodiments, at least a portion of the foam is cross-linked.

In another aspect, the invention features a laminated foam structure including a first skin laminated to a first surface of a core. The core includes a first foam having an average foam density of between about 1 and 6 pounds per cubic foot, the first skin includes a second foam having an average foam density of between about 3 and 18 pounds per cubic foot and a thickness less than ½ inches, and the laminated foam structure has a total thickness of less than about 14 inches.

In another aspect, the invention features a laminated foam structure including a first article laminated to a first surface of a second foam article. The first article is a first foam article having an average foam density that is at least 1.5 times greater than the average foam density of the second foam article and a volume that is at least 1.5 times smaller than the volume of the second foam article.

In another aspect, the invention features a collapsible packaging system. The system includes a sheet having a skin laminated to a surface of a core. The sheet includes a first packing member connected by a hinge region of the sheet to a second packing member, and the core is scored or cut entirely through in the hinged region to form the first and second packing members.

In preferred embodiments, the first packing member is partially defined by a slit extending entirely through the sheet, and by a gap or a thinned region of the sheet permitting clearance between the first and the second packing members as they move relative to one another about the hinged region. The first packing member can be pivoted about the hinge from a storage position in which the first packing member is parallel to and contained within a gap in the second packing member, to a packing position in which the first packing member is oriented transverse to the second packing member. In other preferred embodiments, the first packing member is tapered, having a wide end nearest to the first hinged region.

In other preferred embodiments, the sheet further includes a third packing member attached to the second packing member by a second hinged region. The third packing member is partially defined by a slit extending entirely through the sheet, and by a gap or a thinned region of the sheet permitting clearance between the second and the third packing members as they move relative to one another about the second hinged region. In the storage position, both the first and the third packing member are parallel to and positioned within the second packing member, and, in the packing position, the first and the third packing members are generally parallel, forming a well for containing a packed item.

In other preferred embodiments, the first packing member is tapered, having a wide end nearest to the first hinged region and the third packing member is tapered, having a wide end nearest to the second hinged region. Preferably, the first packing member and the third packing member are oriented so that the first hinged region and the second hinged region are located opposite to each other on the sheet.

In another aspect, the invention features a method of making a hinge. The method includes the steps of: providing a sheet including a skin laminated to a surface of a core; cutting through the core and the skin of the sheet to form a first packing member; and cutting through the core of the sheet and leaving the skin connected to the first packing member to form a first hinged region. The first packing member can be pivoted about the hinge from a storage position in which the first packing member is parallel to and contained with a gap in, the second packing member, to a packing position in which the first packing member is oriented transverse to the second packing member. In preferred embodiments, the sheet is laminated foam structure.

In preferred embodiments, the method further includes the steps of: cutting through the core and the skin of the sheet to form a third packing member; and cutting through the core of the sheet and leaving the skin connected to the third packing member to form a second hinged region, whereby the third packing member can be folded along the second hinged region. In the storage position, both the first and the third packing member are parallel to and positioned within the second packing member, and, in the packing position, the first and third packing members are generally parallel, forming a well for containing a packed item.

In other preferred embodiments, the first foam structure, which is a skin, is laminated to a surface of the second foam structure, which is a core, the core including at least two core elements separated by a bending region that is a gap or crease in the core, whereby the laminated foam structure can be folded along the bending region.

In other preferred embodiments, the first foam article is a skin having an average foam density of between about 3 and 18 pounds per cubic foot and a thickness less than 5/16 inch, and the second foam article is a core having an average density of between about 1 and 6 pounds per cubic foot and a thickness of between 1 and 12 inches. More preferably, each of the foam articles has an average foam density of less than 3 pounds per cubic foot and the core thickness is between 1 and 5 inches. In other preferred embodiments, the second foam has an average foam density greater between 10 and 12 pounds per cubic inch and a thickness of between 1/16 and 1/8 inch. In other preferred embodiments, the first foam article includes at least two laminated foam articles.

The foam structures can include a variety of polyolefins in the composition, including single-site initiated polyolefin resins. Polyethylenes include ethylene-containing polyolefins. Single-site initiated polyolefin resins include polyolefins prepared from a single-site initiator that has controlled molecular weights and molecular weight distributions. The polyolefin can be polyethylene, polypropylene, or a copolymer of ethylene and alpha-unsaturated olefin monomers.

Copolymers include polymers resulting from the polymerization of two or more monomeric species, including terpolymers (e.g., resulting from the polymerization of three monomeric species), sesquipolymers, and greater combinations of monomeric species. Copolymers are generally polymers of ethylene with $C_3$–$C_{20}$ alpha-olefins, and/or diolefins.

The average foam densities can be measured according to ASTM-3575, for example.

The foams in the laminated foam structures of the invention can be cross-linked. Cross-linking can occur by high energy irradiation, most preferably electron beam irradiation, peroxide treatment, or silane-grafting and cross-linking by treatment with water. Silane-grafting generally involves attaching one or more silicon-containing monomer or polymer to the original polymer chains. The use of silane-grafting for cross-linking in polymer foams is described, for example, in U.S. Ser. No. 08/308,801 now abandoned, filed Sep. 19, 1994 and entitled "Cross-Linked Foam Structures of Essentially Linear Polyolefins and Process for Manufacture," which is incorporated herein by reference, and in U.S. Ser. No. 08/638,122 now U.S. Pat. No. 5,844,009. The preferred foam structures contain silane-grafted cross-linked resins.

The foams of the laminated foam structures are generally closed-cell foams. The term "closed-cell," as used herein, means that predominantly, greater than approximately 70% of the foam cell volumes have cell walls isolating them from the external atmosphere. One way to determine this is by measuring the amount of water that is absorbed into the foam when the foam is immersed in water.

The invention can have one or more of the following advantages. The laminate structures include a core of a low density foam and one or more skins of relatively high density foam covering the core which improves, for example, the flexural strength, resistance to bending, and resulting damage from bending in the laminated foam structure. Because the skin is thin relative to the core, the overall weight of the laminated structure is increased little relative to the increase obtained in the physical properties of the structure. Additional improvement in the physical foam properties can result when a high density layer is added in the center of the low density core. The high density layer can help further dissipate loading forces.

In addition to improving the overall structural properties of the foam structures, the laminated structures can also have an improved smoother surface on the laminate. Because the skin generally has a higher average density than the core, it is generally a tougher material than the core. The "toughened" surface of the structure makes it more durable as well.

The foams including silane-grafted single-site initiated polyolefin resins generally have lower foam densities while retaining good strength and other physical foam properties. See, for example, U.S. Ser. No. 08/638,122. In general, by lowering the average density and improving the physical properties of the laminated foam structures, laminated structures that contain less material are obtained. This decreases the cost of the materials and decreases wasted material compared to non-laminated structures.

The laminated foam structures can be produced in a continuous laminating operation. Moreover, the structures can be die cut quickly and efficiently, for use in a variety of applications, such as packaging. Efficient heat lamination of the skin to the core eliminates the need to bond to dissimilar surfaces with adhesives for many applications, contributing to the recyclability of the materials.

By cutting through the core layer of the laminated structure and not one of the skins to form a hinge, the resulting laminated foam structures are versatile. For example, in packaging applications, the packaging system is readily shipped in flat, collapsed position to take up less space, saving freight and storage expense and simplifying reuse of the material.

Other features and advantages of the invention will be apparent from the following detailed description thereof, and from the claims.

BRIEF DESCRIPTION OF THE DRAWINGS

FIG. 10 is a drawing depicting a side view of the laminated foam structure of FIG. 7.

FIG. 11 is a drawing depicting a cross-sectional side view of the laminated foam structure of FIG. 7.

FIG. 12 is a drawing depicting a perspective view of a laminated foam structure that has been die cut for a packaging application in the expanded configuration.

FIG. 15 is a drawing depicting a cross-sectional side view of the laminated foam structure of FIG. 12.

DETAILED DESCRIPTION

The laminated polymeric foam structures include a core of a low density foam and one or more skins of high density foam relative to the core that are laminated to the core. The skin covers a surface of the core. In general, the core has a skin on at least one surface of the core and can have a second skin laminated to another surface of the core. In general, each of the skins and the core can be a laminated foam structure. The laminated structure can be produced using any conventional lamination technique, including heat, film, or adhesive lamination. The laminated construction improves the mechanical properties of the structure such as proportional limit, compressive properties, shear properties, fatigue, and buckling.

Preferably, the foam articles are foam sheets or planks which can be prepared as described, for example, in U.S. Ser. No. 08/638,122 now U.S. Pat. No. 5,844,009. Foam articles with a broad range in physical properties, including a broad range of average foam densities, can be prepared by the methods described therein. Particularly preferred laminated foam structures are described and illustrated in FIGS. 1, 2, and 3.

Figure 1:
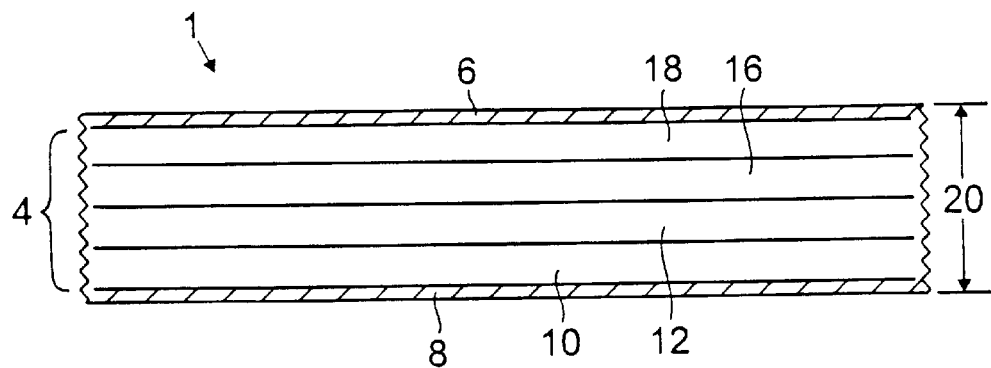
FIG. 1 is a drawing depicting a laminated foam structure having a low density core and two high density skins.

Referring to FIG. 1, the laminated foam structure 1 has a core 4 laminated to a first skin 6 on one surface of core 4. The core 4 is also laminated to a second skin 8 on a second surface of core 4. Skin 6 and skin 8 are generally foams having average densities of between 4 and 12 pounds per cubic foot and thicknesses of between ¹⁄₁₆ and ⅛ inches. Core 4 is a laminated foam with multiple layers. In these preferred embodiments, core 4 has four layers including foam 10, foam 12, foam 16, and foam 18. The foams 10, 12, 16, and 18 in core 4 each have average foam densities of between 1.2 and 2.5 pounds per cubic foot and thicknesses of between ⅜ and ⅝ inches. Core 4, and its constituent foams 10, 12, 16 and 18, have average foam densities that are low relative to the first skin 6 and second skin 8. The structure 1 has a total thickness 20 which is generally between ¾ and 8 inches. Foams according to FIG. 1 can be used in packaging applications.

Figure 2:
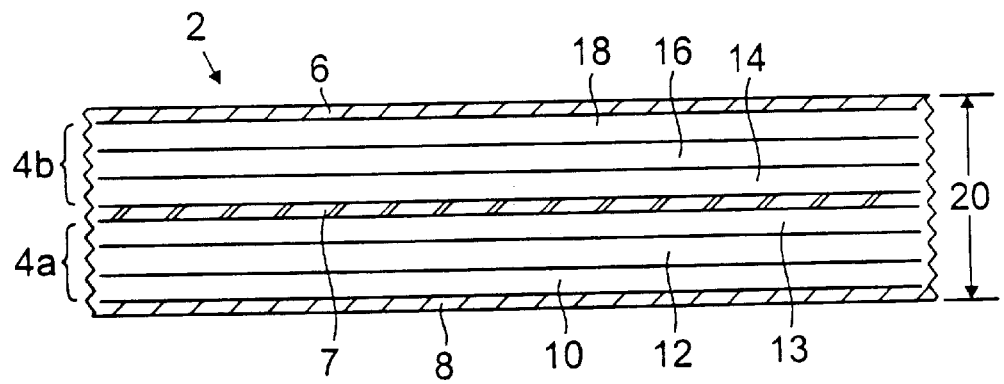
FIG. 2 is a drawing depicting a laminated foam structure having a low density core with a high density foam layer and two high density skins.

Referring to FIG. 2, the laminated foam structure 2 has a core consisting of a low density sub-core 4a and a low density sub-core 4b laminated, respectively, to each surface of a relatively high density foam layer 7. The foam layer 7 is a foam having an average density of between 4 and 12 pounds per cubic foot and a thickness of between ¹⁄₁₆ and ⅛ inches. The core is laminated to a first skin 6 on one surface of the core and to a second skin 8 on a second surface of the core. Skin 6 and skin 8 are generally foams having average densities of between 4 and 12 pounds per cubic foot and thicknesses of between ¹⁄₁₆ and ⅛ inches. Each of the sub-cores 4a and 4b is a laminated foam with multiple layers. In this preferred embodiment, sub-core 4a has three layers including foam 10, foam 12, and foam 13 and sub-core 4b has three layers including foam 14, foam 16, and foam 18. The foams 10, 12, 13, 14, 16, and 18 in the core each have average foam densities of between 1.2 and 2.5 pounds per cubic foot and thicknesses of between ⅜ and ⅝ inches. Each sub-core 4a and 4b, their constituent foams, and the core including foam layer 7 have average foam densities that are low relative to the first skin 6 and second skin 8. The structure 2 has a total thickness 20 which is generally between ¾ and 8 inches or greater. Foams according to FIG. 2 can be used in packaging applications.

Figure 3:
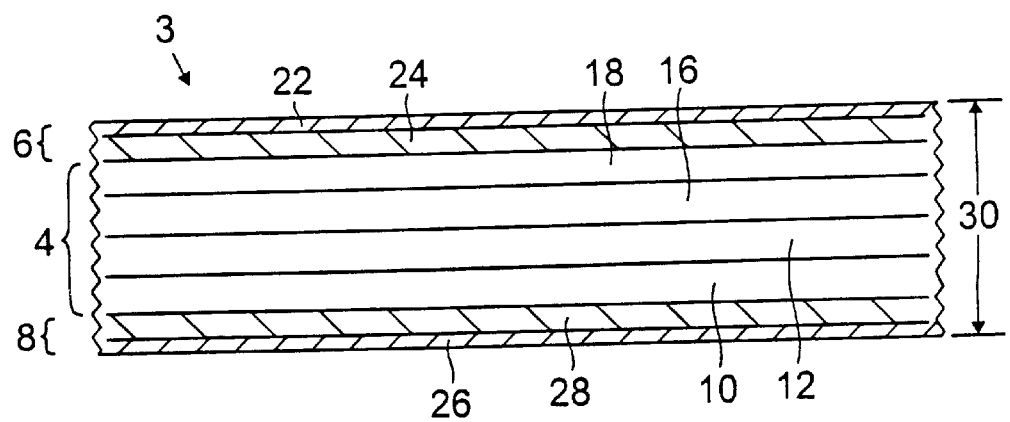
FIG. 3 is a drawing depicting a laminated foam structure having a low density core and two laminated high density skins.

Referring to FIG. 3, the laminated foam structure 3 has a core 4 laminated to a first skin 6 on one surface of core 4. The core 4 is also laminated to a second skin 8 on a second surface of core 4. Core 4 is a laminated foam with multiple layers. In this embodiment, core 4 has four layers including foam 10, foam 12, foam 16, and foam 18 each have average foam densities of between 1.2 and 2.5 pounds per cubic foot and thicknesses of between ⅜ and ½ inches. Core 4, and its constituent foams 10, 12, 16 and 18, have average foam densities that are low relative to the first skin 6 and second skin 8. Skin 6 is a laminated foam including outer foam 22 and inner foam 24. Skin 8 is a laminated foam including outer foam 26 and inner foam 28. Foams 22, 24, 26, and 28 each have average densities of between 4 and 12 pounds per cubic foot and thicknesses of between ¹⁄₁₆ and ⅛ inches, with the outer foams 22 and 26 having average densities lower than the inner foams 24 and 28. In preferred embodiments, each of outer foams 22 and 26 has an average density of 6 pounds per cubic foot and a thickness of between ¹⁄₁₆ and ⅛ inches and each of inner foams 24 and 28 has an average density of 8 pounds per cubic foot and a thickness of about ⅛ inch. Core 4 is a laminated foam with multiple layers. In these preferred embodiments, core 4, and its constituent foams 10, 12, 16 and 18, have average foam densities that are low relative to the first skin 6 and second skin 8. The structure 3 has a total thickness 30 generally between 2 and 2¼ inches. Foams according to FIG. 3 can be used in water sports as body boards or kick boards, in exercise equipment (e.g., as gym mats), and in construction applications as eaves fillers.

The preferred foams are polyethylene foams that are described, for example, in U.S. Ser. No. 08/638,122. The preferred skins are foams that have an average foam densities of between about 4 and 15 pounds per cubic foot (pcf), preferably between about 4 and 12 pcf, and thicknesses between ¹⁄₁₆ and ⅜ inches. Most preferably, the skins have average foam densities of about 8 pcf and thicknesses of ⅛ inch. The preferred core is a foam with an average foam density of less than 4 pcf, preferably between about 1.2 and 2.5 pcf. The core is a foam laminate with multiple foam layers each having thicknesses between about ⅜ and ⅝ inches. The laminated core preferably has between 2 and 20 foam layers. The total thickness of the core layer is determined by the overall thickness requirement of the application of the laminated foam structure. The total thickness of the laminated foam structure is, most preferably, between about ¾ and 12 inches. The laminated core can include a high density foam layer, having an average foam density between about 4 and 12 pcf and thicknesses between ¹⁄₁₆ and ⅜ inches.

In embodiments in which the skin is a laminate, the outer layer of the skin preferably has a higher density than the adjacent foam layer. In the laminated skin, the preferred skin preferably has an average foam density of 8 pcf and a thickness of ⅛ inch which is laminated to an outer skin of having an average foam density of 6 pcf and a thickness of about 1/16 inch. The laminated skin structure gives better resistance to creasing in flexure, which is important, for example, in the water sports applications such as body boards.

The laminated foam structures and their potential applications are varied. For example, a laminated foam structure with a total thickness between about 3/4 to 8 inches is useful in packaging. The low density foam core contributes to a low weight of the total package while the high density foam of the skin provides aesthetic improvement and improved load spreading properties. The skin has a higher foam density, generally as a result of smaller cell size. As a result, the surface of the skin is denser and smoother than the surface of the low density core and has the appearance of a highly cross-linked surface.

The embodiments depicted in FIG. 1 or FIG. 2 are examples of structures that can be used in packaging applications. In another example, a 2 inch laminated foam structure can be used in exercise equipment such as gym mats, where the high density skin gives improved load spreading and resistance to damage resulting from heavy use. In another example, a 1 inch laminated foam structure can be used as a construction eaves filler, where the high density skin gives the structure improved compression resistance, a more durable surface, and improved die cutting characteristics. In another example, a 2 inch laminated foam structure can be used in the water sports industry for making body boards, where the improved flexural strength gives resistance to bending and creasing, as well as fatigue resistance. The embodiments depicted in FIG. 3 are examples of structures that can be used in water sports, exercise, and construction applications. In each of the preceding examples, the laminated foam structures generally provides for overall weight reductions over an extruded plank construction, increased compression resistance, and improved load spreading behavior.

Assorted shapes can be cut for the laminated foam structures with either solid or foamed cores. The shape is configured for particular end applications (e.g., to fit into an end product). Alternatively, the structure is cut to form a hinge so that the structure can be folded into different shapes. For example, the core of the laminated foam structure of a sheet can be cut to form a piece (i.e., packing member), leaving a section of the skin intact in one region of the perimeter of the piece so that the skin can act as a hinge. The piece can be positioned in the plane of the sheet from which it was cut (i.e., in a collapsed or closed form). Alternatively, the piece can be positioned out of the plane of the sheet (i.e., in an expanded or open form). By tapering the piece, it is possible to form a locking mechanism to hold the piece in the expanded or collapsed form. In the expanded form, the area formerly occupied by the piece forms a void in the sheet that can be sized to fit a product for packaging.

Cutting of pieces or shapes can be achieved by hand using knives or scissors. A more efficient method is to use sharpened steel rule dies of forged dies to cut the entire shape all at once (i.e., die cutting). In this process, a hydraulic press, or a "Clicker" type press, operating at pressures between 50 and 150 psi and at room temperature, can be used to press the die into the laminated polymer structure. Once the press has forced the die through the material, completely severing it from the rest of the structure, the "puzzle-like" piece can be removed for use. In order to form a hinge from the skin to link the cut piece to the remainder of the sheet, a section of the die is offset so that it cuts through the core, but does not cut through or sever the skin.

Figure 6:
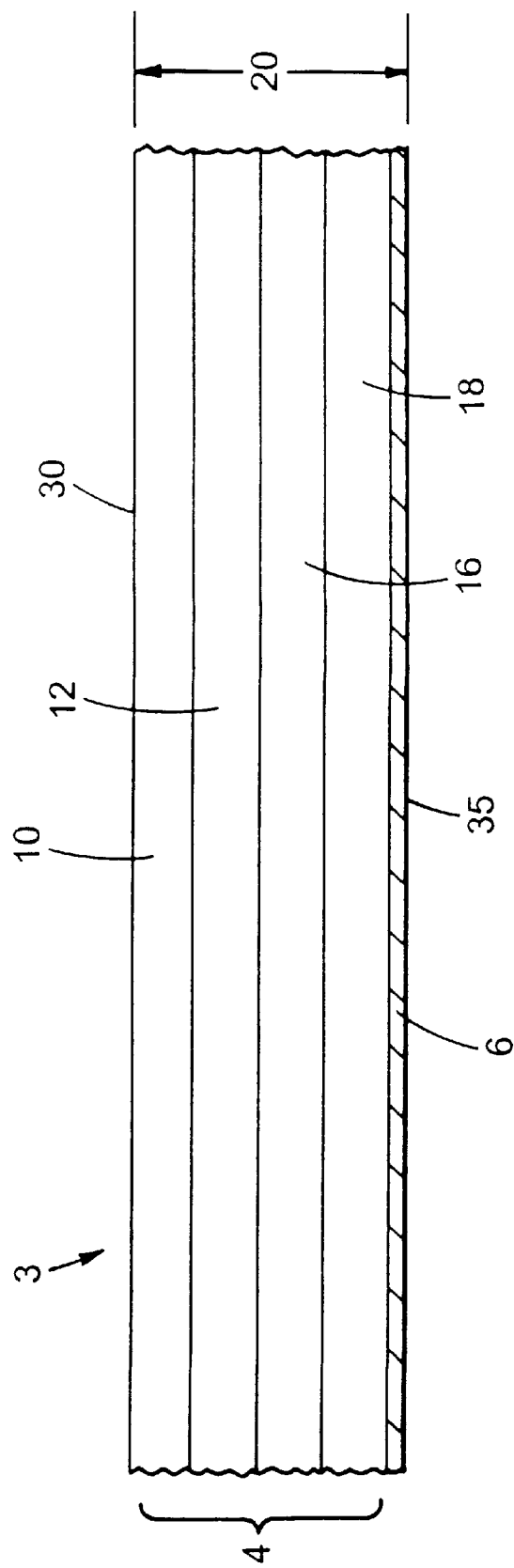
FIG. 6 is a drawing depicting a laminated foam structure having a low density core and one high density skin.
Figure 7:
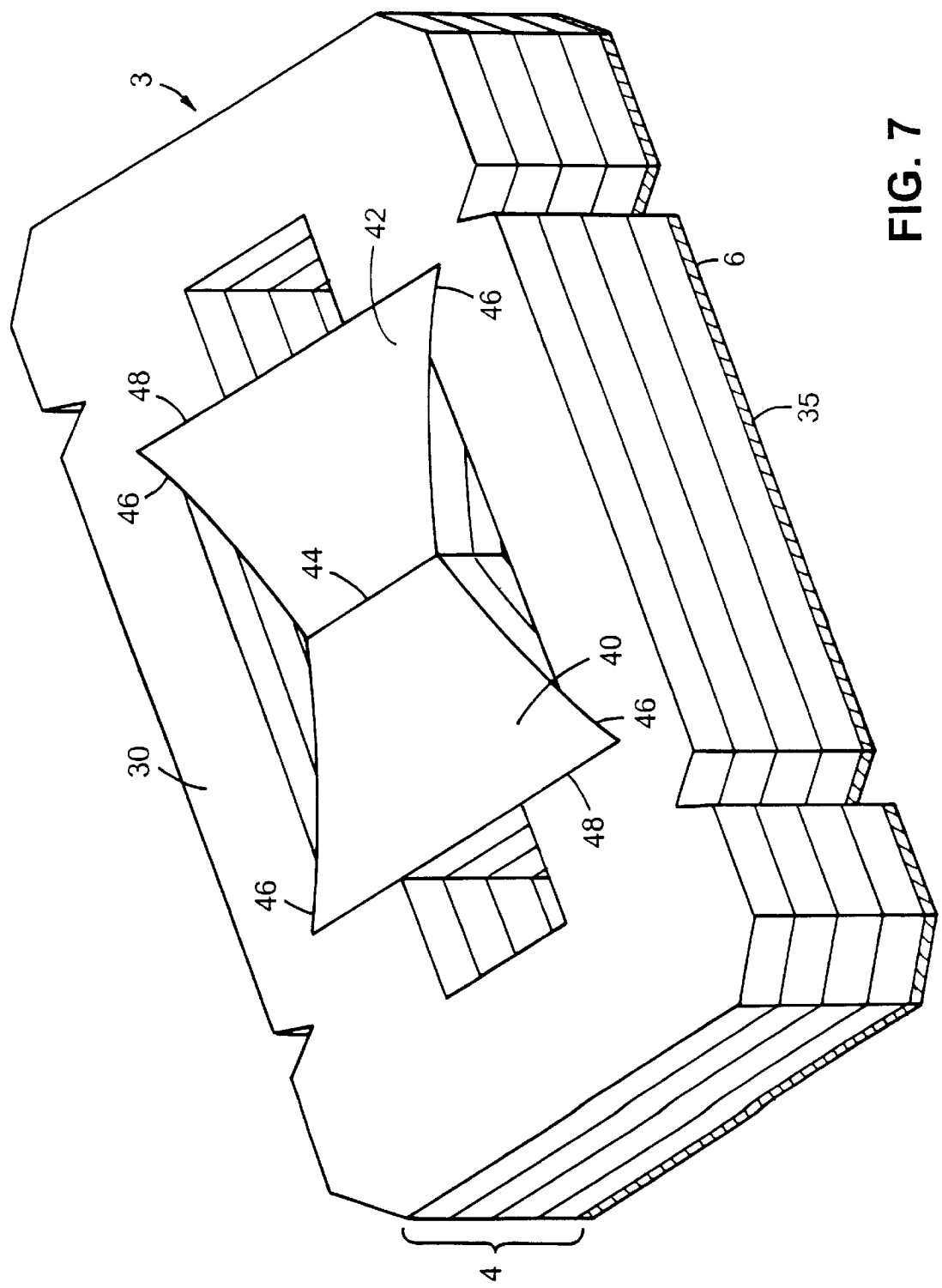
FIG. 7 is a drawing depicting a perspective view of a laminated foam structure that has been die cut for a packaging application in the collapsed configuration.
Figure 8:
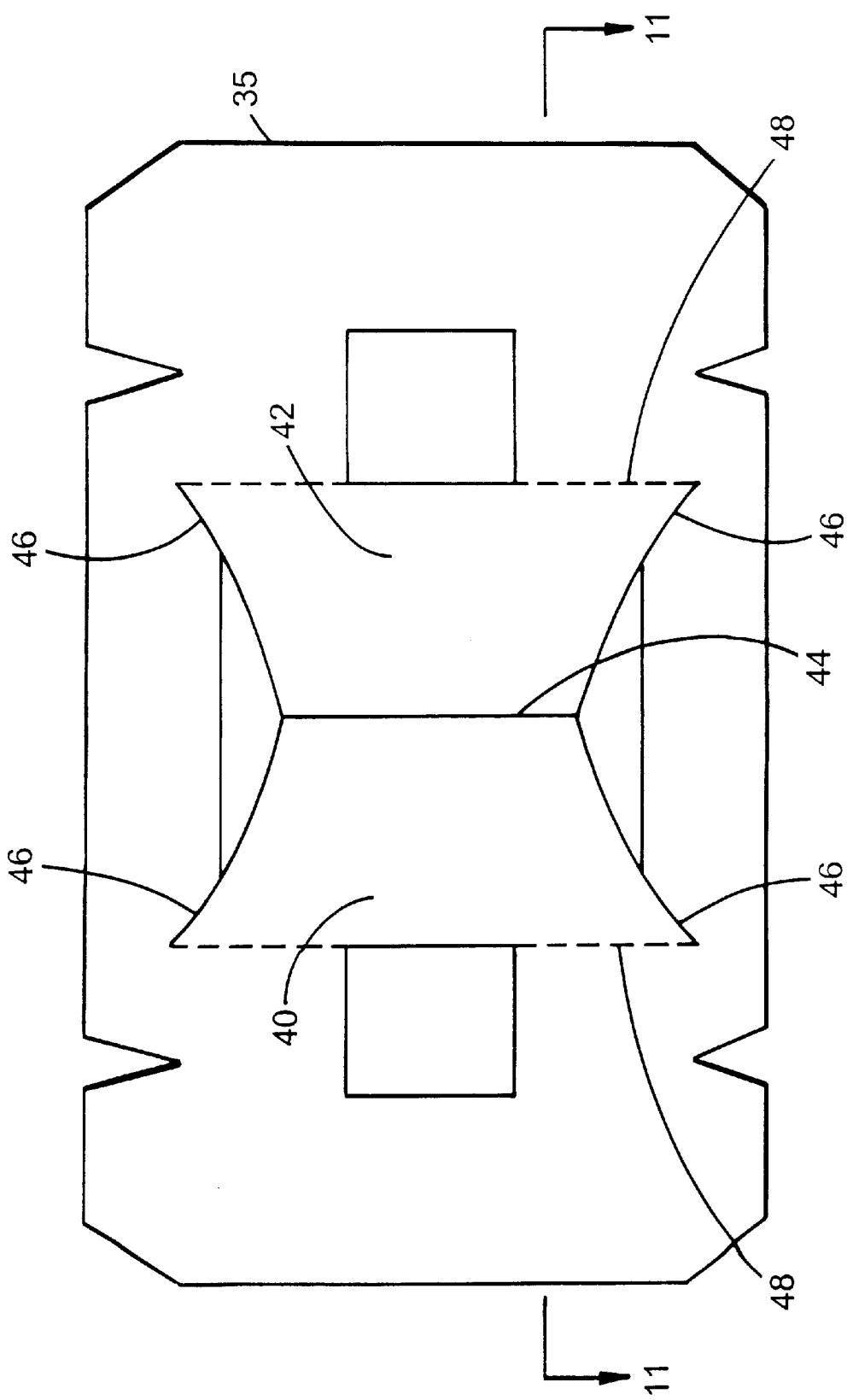
FIG. 8 is a drawing depicting a bottom view of the laminated foam structure of FIG. 7.
Figure 9:
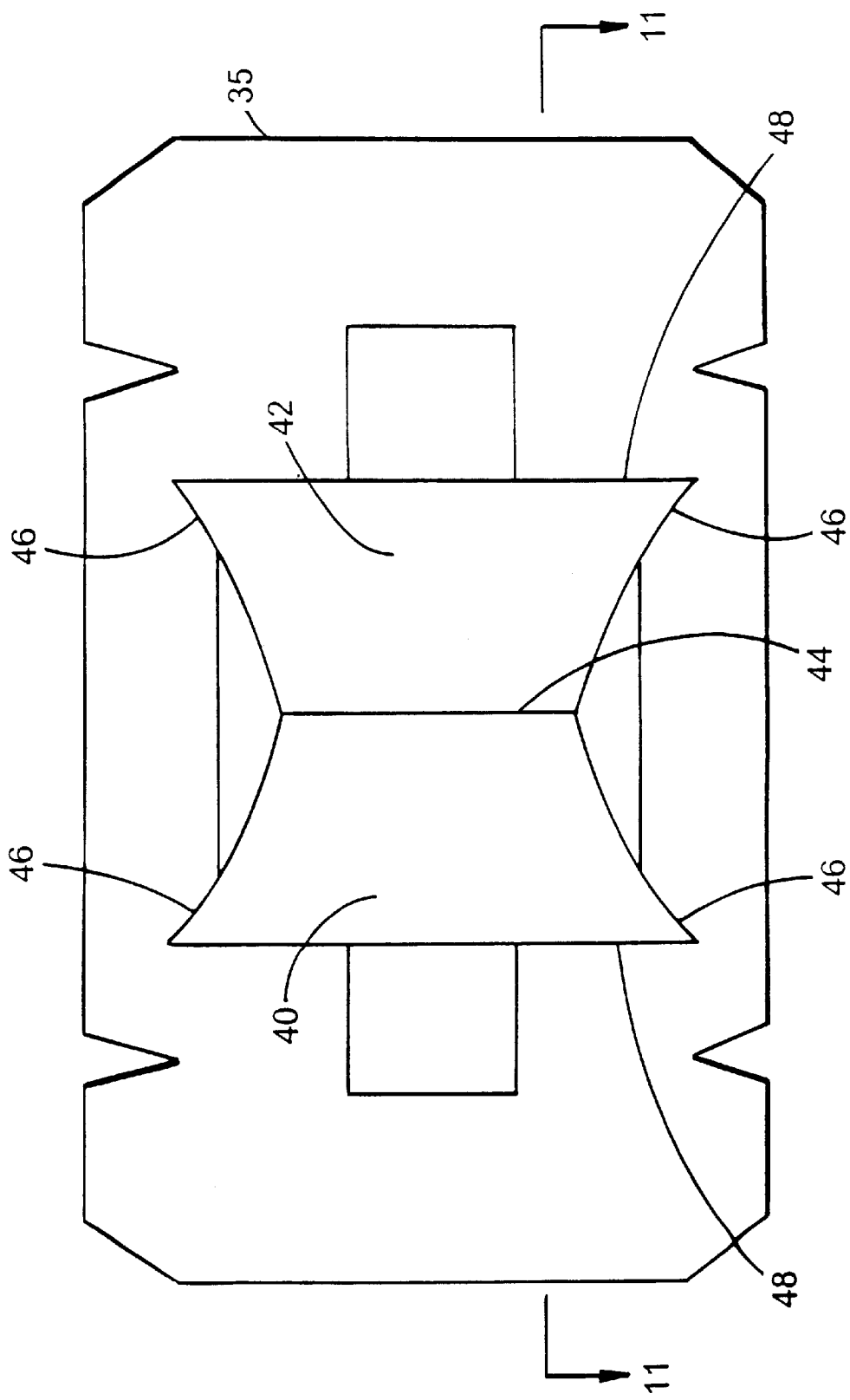
FIG. 9 is a drawing depicting a top view of the laminated foam structure of FIG. 7.
Figure 13:
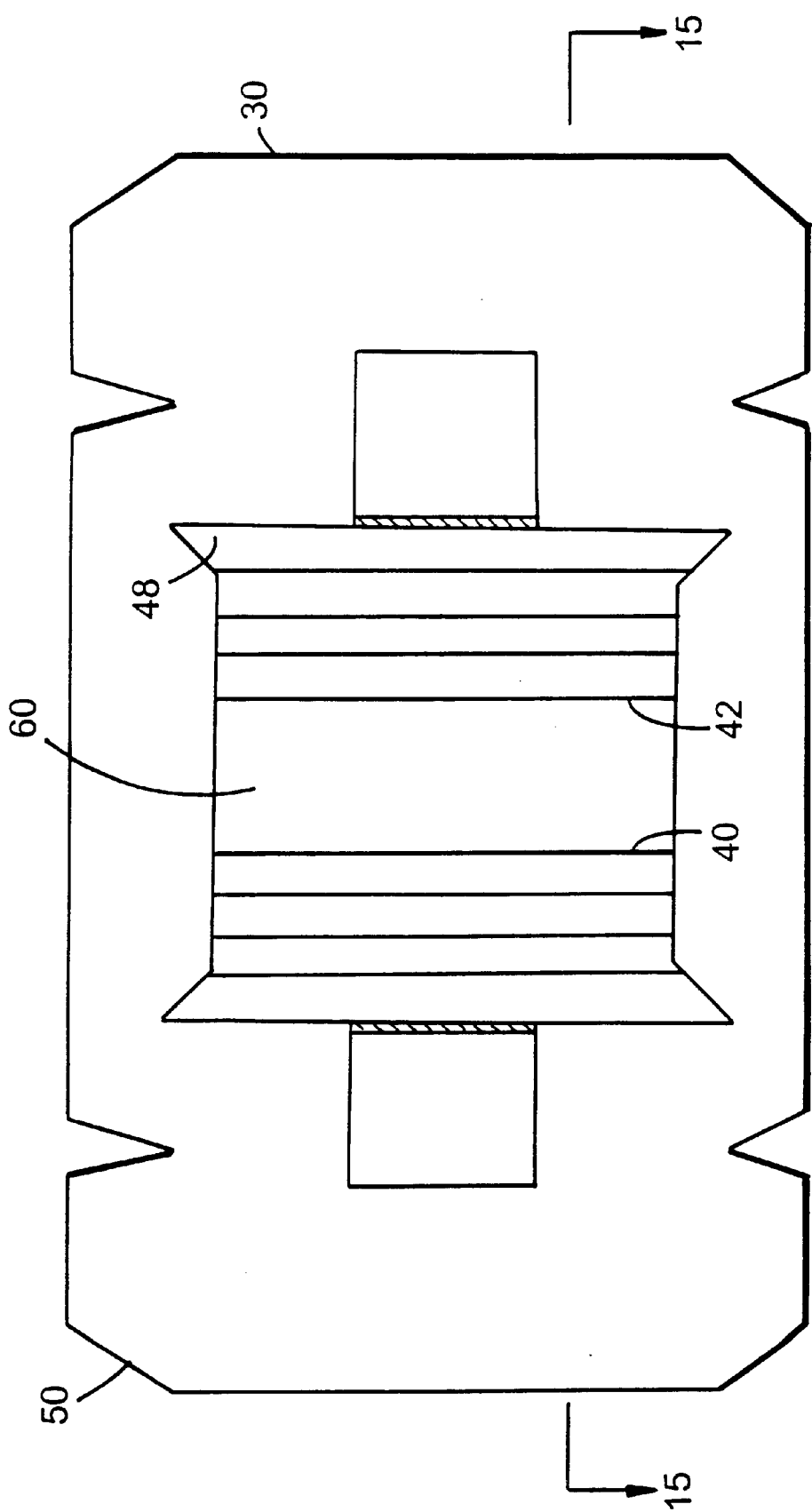
FIG. 13 is a drawing depicting a top view of the laminated foam structure of FIG. 12.

Referring to FIG. 6, the laminated foam structure 3 is a flat sheet that has a core 4 laminated to a first skin 6 on one surface of core 4. Structure 3 has a top surface 30, which is an exposed surface of core 4, and a bottom surface 35, which is an exposed surface of skin 6. Skin 6 is generally foams having average densities of between 3 and 18 pounds per cubic foot and thicknesses of between 1/32 and 5/16 inches. Core 4 is a laminated foam with multiple layers. Alternatively, core 4 can be a single section of foam. In preferred embodiments, core 4 has four layers including foam 10, foam 12, foam 16, and foam 18. The foams 10, 12, 16, and 18 in core 4 each have average foam densities of between 1.5 and 2.5 pounds per cubic foot and thicknesses of between 3/8 and 5/8 inches. The core foams are preferably polyolefin foams, such as a polyethylene or polypropylene foam that is closed cell in nature. Core 4, and its constituent foams 10, 12, 16 and 18, have average foam densities that are low relative to skin 6. Skin 6 provides strength to the structure and can act as a hinge when the structure of the foam is properly cut. The structure 3 has a total thickness 20 which is generally between 1 and 14 inches. The laminated foam structure is effectively bonded together using heat lamination to enhance recyclability of the material, however, glue or adhesive or any other material useful for lamination may be used to effect the bond. Structures according to FIG. 6 can be used in packaging applications.

Referring to FIGS. 7–11, laminated foam structure 3 can be die cut for packaging applications to form a collapsible packaging system that is shown in the collapsed configuration. Piece 40 (i.e., a first packing member) and piece 42 (i.e., a second packing member) are cut from structure 3 by completely cutting through core 4 and skin 6 at head slit 44 and side slits 46. Referring to FIG. 11, tail slit 48 is cut from the top surface 30 through core 4 and not through skin 6, forming a hinge between piece 40 (or piece 42) and the remainder of the sheet. Tail slit 48 does not extend to bottom surface 35. The die cut can be designed so that sections of the laminated foam article can be removed altogether to lower the total weight of the collapsible packaging system.

Referring to FIGS. 12–15, die cut laminated foam structure 3 depicted in FIGS. 7–11 can be expanded to form end cap 50 for use in packaging. Piece 42 is extended out of the plane of the sheet by bending along the hinge formed at tail slit 48 onto bottom surface 35. Piece 40 is similarly extended to form the expanded configuration. In this expanded configuration, well 60 is formed.

Figure 14:
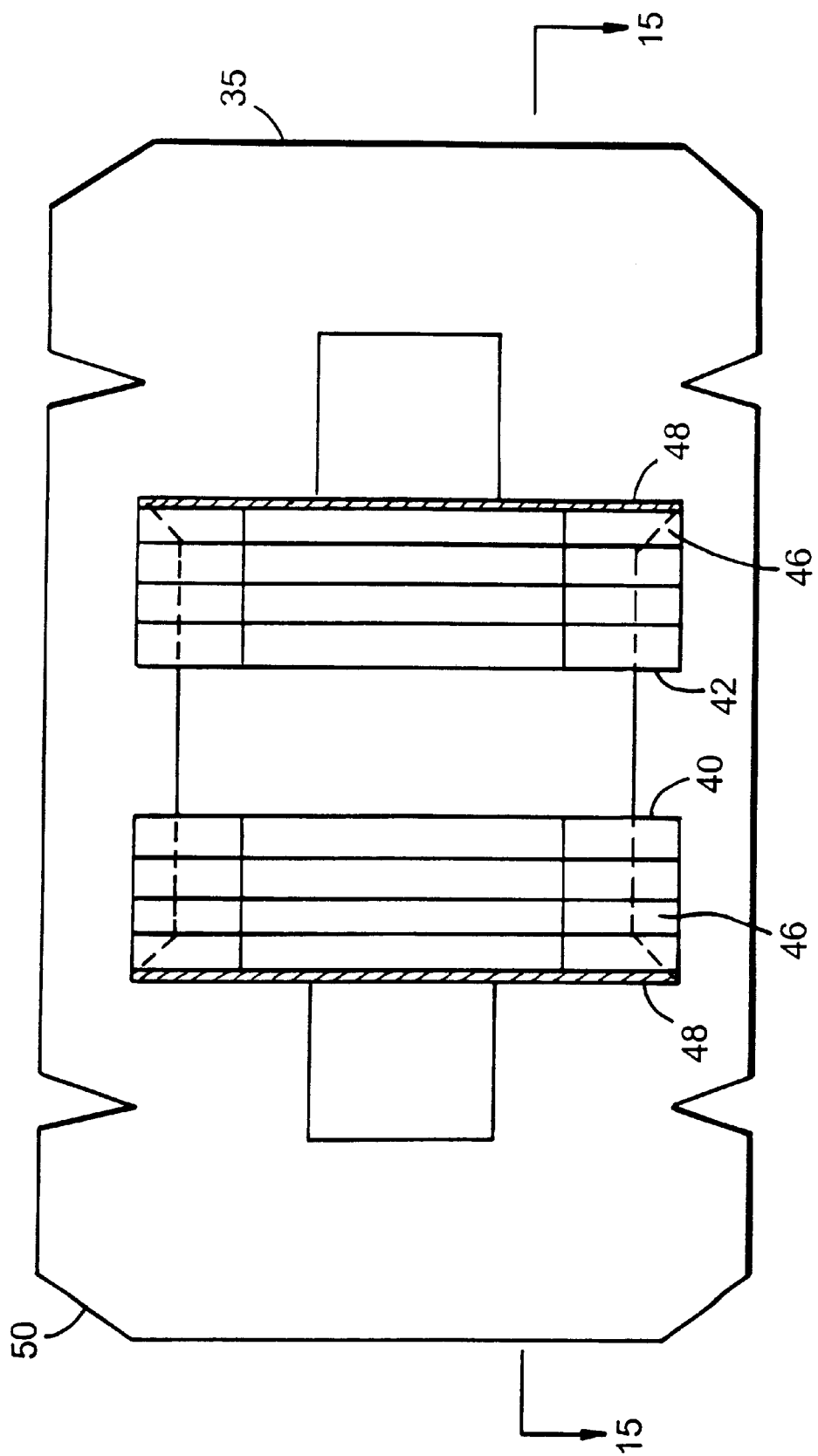
FIG. 14 is a drawing depicting a bottom view of the laminated foam structure of FIG. 12.

Pieces 40 and 42 are tapered, having wider ends at tail slits 48 than at head slit 44. Referring to FIG. 14, the tapering of pieces 40 and 42 allow them to lock into place when extended from the sheet and the hinge is bent at an angle 90° to bottom 35.

The dimensions of well 60 are suited to fit end cap 50 onto, for example, each end of a packaged product. The outer dimensions of end cap 50 are suitable securing the product having two end caps in a carton, box, or other suitable container.

When not being used for packaging a product, the expanded configuration of end cap 50 can be collapsed back into the space-efficient sheet form for storage or transport of the collapsible packaging system. The hinge structures allow the packaging system to be efficiently reused.

Die cutting is the preferred operation for cutting the laminated foam structures since it is simple to carry out and repeat (e.g., automate). The cutting operation is the only necessary step for producing protective collapsible packaging systems directly from the laminated foam structures.

Laminated foam structures having more than one high density skin (i.e., a skin on both surfaces of the structure) can be cut in a similar manner to form the hinges and collapsible packaging systems. For example, the additional skin can be added for additional structural stability and support.

The foams are generally foamed polymers and polymer blends. Examples of suitable polymers include single-site initiated polyolefins, low density polyethylene (LDPE), high density polyethylene (HDPE), linear low density polyethylene (LLDPE), ethylene-propylene rubber, ethylene-propylene-diene monomer terpolymer (EPDM), polystyrene, polyvinylchloride (PVC), polyamides, polyacrylates, celluloses, polyesters, polyhalocarbons, and copolymers of ethylene with propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, acrylic acid, or methacrylic acid. The polymer blends can also include rubber materials such as polychloroprene, polybutadiene, polyisoprene, polyisobutylene, nitrile-butadiene rubber, styrene-butadiene rubber, chlorinated polyethylene, chlorosulfonated polyethylene, epichlorohydrin rubber, polyacrylates, butyl rubber, or halobutyl rubber. The rubber material can be peroxide-cured or vulcanized. Preferred resins include single-site initiated polyolefins, LDPE, LLDPE, polypropylene, polystyrene, or ethylene copolymers such as ethylene-vinyl acetate copolymer (EVA), or ethylene-ethyl acrylate copolymer (EEA).

The single-site initiated polyolefin resins are derived from ethylene polymerized with at least one comonomer selected from the group consisting of at least one alpha-unsaturated $C_3$–$C_{20}$ olefin comonomers. Preferably, the alpha-unsaturated olefins contain between 3 and 16 carbon atoms, most preferably between 3 and 8 carbon atoms. Examples of such alpha-unsaturated olefin comonomers used as copolymers with ethylene include, but are not limited to, propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinylcyclohexene, and vinylbenzocyclobutane. The comonomer content of the polyolefin resins is generally between about 1 mole percent and about 32 mole percent, preferably between about 2 mole percent and about 26 mole percent, and most preferably between about 6 mole percent and about 25 mole percent.

The copolymer can include one or more $C_4$–$C_{20}$ polyene monomers. Preferably, the polyene is a straight-chain, branched chain or cyclic hydrocarbon diene, most preferably having between 6 and 15 carbon atoms. It is also preferred that the diene be non-conjugated. Examples of such dienes include, but are not limited to, 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene, and dicyclopentadiene. Especially preferred is 1,4-hexadiene.

The preferred single-site initiated polyolefin resins include either ethylene/alpha-unsaturated olefin copolymers or ethylene/alpha-unsaturated olefin/diene terpolymers.

Single-site initiated polyolefin resins can be prepared using single-site initiators. One class of a single-site initiators of particular interest are the metallocene initiators which are described, for example, in J. M. Canich, U.S. Pat. No. 5,026,798, in J. Ewen, et al., U.S. Pat. No. 4,937,299, in J. Stevens, et al., U.S. Pat. No. 5,064,802, and in J. Stevens, et al., U.S. Pat. No. 5,132,380, each of which are incorporated herein by reference. These initiators, particularly those based on group 4 transition metals, such as zirconium, titanium and hafnium, are extremely high activity ethylene polymerization initiators. The single-site initiators are versatile. The polymerization conditions such as a initiator composition and reactor conditions can be modified to provide polyolefins with controlled molecular weights (e.g., in a range from 200 g mol$^{-1}$ to about 1 million or higher g mol$^{-1}$) and controlled molecular weight distributions (e.g., $M_w/M_n$ in a range from nearly 1 to greater than 8, where $M_w$ is the weight average molecular weight and $M_n$ is the number average molecular weight). Molecular weights and molecular weight distributions of polymers can be determined, for example, by gel permeation chromatography.

When the single-site initiated polyolefins are copolymers, the composition distribution breadth index (CDBI) is generally greater than 50% and most preferably above 70%. The CDBI is a measurement of the uniformity of distribution of comonomers among the individual polymer chains having a comonomer content within 50% of the median bulk molar comonomer content.

Preferred single-site initiated polyolefin resins are described, for example, in S.-Y. Lai, et al., U.S. Pat. Nos. 5,272,236, 5,278,272, and 5,380,810, in L. Spenadel, et al., U.S. Pat. No. 5,246,783, in C. R. Davey, et al., U.S. Pat. No. 5,322,728, in W. J. Hodgson, Jr., U.S. Pat. No. 5,206,075, and in F. C. Stehling, et al., WO 90/03414, each of which is incorporated herein by reference. The resins contain varying amounts of short-chain and long-chain branching, which depend, in part, on the processing conditions.

Some single-site initiated polyolefin resins are available commercially from Exxon Chemical Company, Houston, Tex., under the tradename Exact™, and include Exact™ 3022, Exact™ 3024, Exact™ 3025, Exact™ 3027, Exact™ 3028, Exact™ 3031, Exact™ 3034, Exact™ 3035, Exact™ 3037, Exact™ 4003, Exact™ 4024, Exact™ 4041, Exact™ 4049, Exact™ 4050, Exact™ 4051, Exact™ 5008, and Exact™ 8002. Other single-site initiated resins are available commercially from Dow Plastics, Midland, Mich. (or DuPont/Dow), under the tradenames Engage and Affinity, and include CL8001, CL8002, EG8100, EG8150, PL1840, PL1845 (or DuPont/Dow 8445), EG8200, EG8180, GF1550, KC8852, FW1650, PL1880, HF1030, PT1409, CL8003, and D8130 (or XU583-00-01). Most preferably, the single-site initiated polyolefin resins are selected from the group consisting of Exact™ 3024, Exact™ 3031, Exact™ 4049, PL1845, EG8200, and EG8180.

The preferred foams include polyethylene, such as, for example, single-site initiated polyethylenes or LDPE. LDPE resins are described, for example, in "Petrothene® Polyolefins . . . A Processing Guide," Fifth edition, Quantum USI Division, 1986, pages 6–16, incorporated herein by reference. Some LDPE resins are commercially available from Exxon Chemical Company, Houston, Tex., Dow Plastics, Midland, Mich., Novacor Chemicals (Canada) Limited, Mississauga, Ontario, Canada, Mobil Polymers, Norwalk, Conn., Rexene Products Company, Dallas, Tex., Quantum Chemical Company, Cincinnati, Ohio, and Westlake Polymers Corporation, Houston, Tex. Commercially available LDPE resins include Eastman 1924P, Eastman 1550F, Eastman 800A, Exxon LD 117.08, Exxon LD 113.09, Dow 535I, Dow 683, Dow 760C, Dow 768I, Dow 537I, Novacor LF219A, Novacor LC05173, Novacor LC0522A, Mobil LMA-003, Mobil LFA-003, Rexene 2018 (7018), Rexene 1023, Rexene XO 875, Rexene PE5050, Rexene PE1076, Rexene PE2030, Quantum NA953, Quantum NA951, Quantum NA285-003, Quantum NA271-009, Quantum NA324, Westlake EF606AA, Westlake EF612, and Westlake EF412AA.

The foams can be cross-linked, however, non-cross-linked foams also can be made. The foams can be cross-linked with peroxides, UV irradiation, or by silane-grafting. The use of silane-grafting for cross-linking in polymer foams is described, for example, in U.S. Ser. No. 08/308,801, and in U.S. Ser. No. 08/638,122.

The foam can preferably be a polymer blend including at least one silane-grafted single-site initiated polyolefin resin. The preferred level of silane-grafted single-site initiated polyolefin resin, in weight percent of the total polymeric content of the foam, is preferably between about 2 percent and about 30 percent more preferably between about 3 percent and about 18 percent. The single-site initiated polyolefin resin can be silane-grafted before blending with other polymer resins. Alternatively, the foam can be a polymer blend. The blend can be silane-grafted.

Silane-grafting of the polyolefin resin or resin blend occurs when the polymer backbone is activated and reacts with a silane reagent to form the graft copolymer. The silane-graft can include a subsequently cross-linkable moiety in the graft chain. For example, the cross-linking can occur under warm, moist conditions when the cross-linkable moiety is hydrolyzable, optionally in the presence of a suitable catalyst. Levels of cross-linking can be adjusted by varying the amount of silane-grafting introduced to the polymer blend. Alternatively, cross-linking can be introduced by reaction of the polymers with peroxides. UV irradiation of the polymers can also be used to introduce cross-linking.

A cross-linking graft can include other monomers, such as di- and tri-allyl cyanurates and isocyanurates, alkyl di- and tri-acrylates and methacrylates, zinc dimethacrylates and diacrylates, styrenes, divinylbenzene, and butadiene.

The graft initiator, or peroxide cross-linking agent can be a free radical generating species, for example, a peroxide. Examples of peroxides include dicumylperoxide, 2,5-dimethyl-2,5-di(t-butylperoxy)hexane, 1,1-bis(t-butylperoxy)-3,3,5-trimethylcyclohexane, 1,1-di-(t-butylperoxy)cyclohexane, 2,2'-bis(t-butylperoxy) diisopropylbenzene, 4,4'-bis(t-butylperoxy)butylvalerate, t-butylperbenzoate, t-butylperterephthalate, and t-butyl peroxide. Most preferably, the peroxide is dicumylperoxide or 2,2'-bis(t-butylperoxy)diisopropylbenzene.

The silane-grafted polymer can be cross-linked by exposure to moisture to effect silanol condensation reactions of the hydrolyzable groups of the pendant silane-grafts. Cross-linking develops through hydrolysis of the silane Y groups to form silanols which condense to form siloxanes. The condensation of silanols to siloxanes is catalyzed by metal carboxylates such as, for example, dibutyl tin dilaurate or dibutyl tin maleate. The most preferred silanol condensation catalyst is dibutyl tin dilaurate.

The cross-linking of silane-grafted polymers can be induced by the presence of atmospheric moisture, steam, or hot water. Cross-linking can take place predominantly (e.g., more than 50% of the potential cross-linking) prior to expansion (or extrusion) of the foam. Alternatively, the cross-linking can take place predominantly after expansion of the foam.

Exposure of the compositions to high energy radiation to induce cross-linking can be accomplished at dosages of ionizing radiation in the range of about 0.1 to 40 Megarads, and preferably, at about 1 to 20 Megarads. The amount of cross-linking can be appropriately controlled by adjusting the dosage of high energy radiation.

Regardless of the method of cross-linking used, acceptably flexible articles, particularly foamed articles, can only be obtained in certain ranges of cross-linking density or level, which is related to the amount of silane-grafting in the blend. Too much cross-linking can render the material inelastic. In a foam, this can result in less than optimal expansion and greater than optimal density for a given level of foaming agent. Too little cross-linking can be detrimental to physical properties such as compression set properties or thermal resistance, for example. It is important to choose cross-linking levels that afford materials with particular desired properties. The silane-grafting and resulting cross-links increase the melt strength of the composition. The cross-linking levels can be determined by establishing the gel content of the of the composition, for example, by extraction with a solvent such as xylenes.

The foams can be prepared using physical or chemical foaming agents. Physical foaming agents include low molecular weight organic compounds including $C_1$–$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$–$C_5$ organohalogens, $C_1$–$C_6$ alcohols, $C_1$–$C_6$ ethers, $C_1$–$C_5$ esters, $C_1$–$C_5$ amines, ammonia, nitrogen, carbon dioxide, neon, or helium. Chemical foaming agents include, for example, azodicarbonamide, p-p'-oxybis(benzene)sulfonyl hydrazide, p-toluenesulfonyl hydrazide, p-toluenesulfonyl semicarbazide, 5-phenyltetrazole, ethyl-5-phenyltetrazole, dinitrosopentamethylenetetramine, and other azo, N-nitroso, semicarbazide, sulfonyl hydrazides, carbonate, and bicarbonate compounds that decompose when heated. The preferred foaming agents include azodicarbonamide or isobutane.

The foam can be partially or extensively cross-linked prior to expansion, or can be extensively cross-linked after expansion.

Additional additives in the foam composition can dramatically effect the properties of the foam. These include gas exchange additives and cell nucleating agents, such as zinc stearate and talc, respectively. The preferred gas exchange additive concentration in the foam is between 0.5 and 2.0 percent. The preferred cell nucleating agent concentration in the foam is between 0.05 and 2.0 percent. The foam can also include gas exchange additives, also known as cell-structure stabilizers, such as, for example, fatty acids, fatty acid carboxylate salts (e.g., zinc stearate), fatty acid esters (e.g. glycerol monostearate), or fatty acid amides, assist in the gas exchange process and the aging of the foams.

Other additives, alone or in combination, can be added to the foam compositions, including antioxidants (e.g., hindered phenolics such as Irganox 1010, phosphites such as Irgafos 168, or polymerized trimethyl-dihydroquinoline such as Agerite AK, Resin D or Flectol H), ultra-violet stabilizers, thermal stabilizers, antistatic components, flame retardants, pigments or colorants, and other processing aids.

The foam can take virtually any physical configuration, preferably the form of a sheet, plank, or other regular or irregular extruded profile. Foam sheets are extruded from circular dies and have thicknesses between about 1/32 inch and 1 inch and widths up to 82 inches. Parts of smaller size, depending on requirements of the application, can be cut from the sheets. For example, a board with typical dimensions of 20 inches by 30 inches may be cut from the larger sheets, and further shaped by molding or machining to produce a body board for water sports. Alternatively, the foams can be configured as planks, extruded from flat dies, with plank thicknesses between about 1 inch and 4.5 inches and widths between about 24 inches and 48 inches. The foam planks and sheets can be laminated by direct application of heat or adhesives to the interface between two or more planks. In preferred embodiments, it is not necessary to add an adhesive to the interface to laminate the planks or sheets.

The foam lamination can be achieved by heat treatment of the laminate interface, film lamination, or by using an adhesive. These techniques are generally well known in the sheet fabrication industries. Heat lamination is a process in which two sheets of foam or other sheet material are brought together under pressure and heat to join the materials. In practice, foam is taken from rolls of approximately ½ inches thickness×48 inches width×400 feet in length. The foam sheets are fed together with pressure exerted by two turning rollers. Immediately prior to the materials meeting in the nip of the rollers, heat is applied to the surfaces which are about to be pressed together. The heat can be supplied by hot air guns, gas-fired flames, infrared heaters, or a combinations thereof. Heat can be applied to both foam sheets, or only to one. The heat makes the foam surface tacky by creating local regions of melting on the surface. The foam sheets passing through the rollers nip are joined by a bond upon cooling. A similar laminate can be made by applying an adhesive to one or both sheets prior to the foam passing through the nip rollers, or by extrusion of a thin continuous layer of polymer onto one surface immediately prior to the foam passing through the nip rolls. By choosing a film material which is compatible with the substrates, a laminate is formed. Adhesives include, but are not limited to, rubber, epoxy, and acrylic adhesives. Heat and film lamination methods are preferred since those methods can avoid the use of solvents in the lamination process.

In adhesive lamination, the foam articles can be coated with an adhesive using any of a number of conventional coating techniques including reverse roll coating, knife over roll coating, or extrusion coating. Optionally, the coated substrate can be passed through an in-line dryer to remove solvent or water, or to chemically alter the coating. Machinery for coating these tapes can be purchased from equipment suppliers such as Ameriflex Group Incorporated, Black Clawson Converting Machinery Corporation, Inta-Roto, Incorporated, Klockner Er-We-Pa, and Wolverine Massachusetts Corporation.

The following specific examples are to be construed as merely illustrative, and not limitive, of the remainder of the disclosure.

EXAMPLES

A laminated foam structure having four low density foam layers in a core and a higher density skin on each surface of the core can be manufactured using the following steps:
Step 1
Four layers of ½ inch polyethylene foam with a density of 1.7 pcf are continuously laminated from roll stock using hot air injected between the layers which are then pressed together between nip rolls. Sheets are cut after lamination to make handling easier. The 1.7 pcf laminated foam core (hereafter referred to as Example 1A) had a total thickness of 1 inch.

Step 2
A layer of 8 pcf polyethylene foam that is 3/16 inches thick is laminated to one side of the foam core of Example 1A (i.e., the 1 inch thick 1.7 pcf laminated foam core) by feeding the 1 inch thick sheets into the laminator used in step 1. The 8 pcf layer is fed from roll stock. The resultant sheets are cut as in step 1.
Step 3
Step 2 is repeated to laminate a second 8 pcf polyethylene foam layer that is 3/16 inches thick to the other side of the 1.7 sheet, resulting in a laminated foam structure consisting of a core of four laminated 1.7 pcf polyethylene foams with a skin of 8 pcf polyethylene foam on each side of the core with a total thickness of 2.1 inches (i.e., an 8/1.7/8 laminate, hereafter referred to as Example 1). Example 1 has a structure similar to that shown in FIG. 1.

EXAMPLE 2

Figure 4:
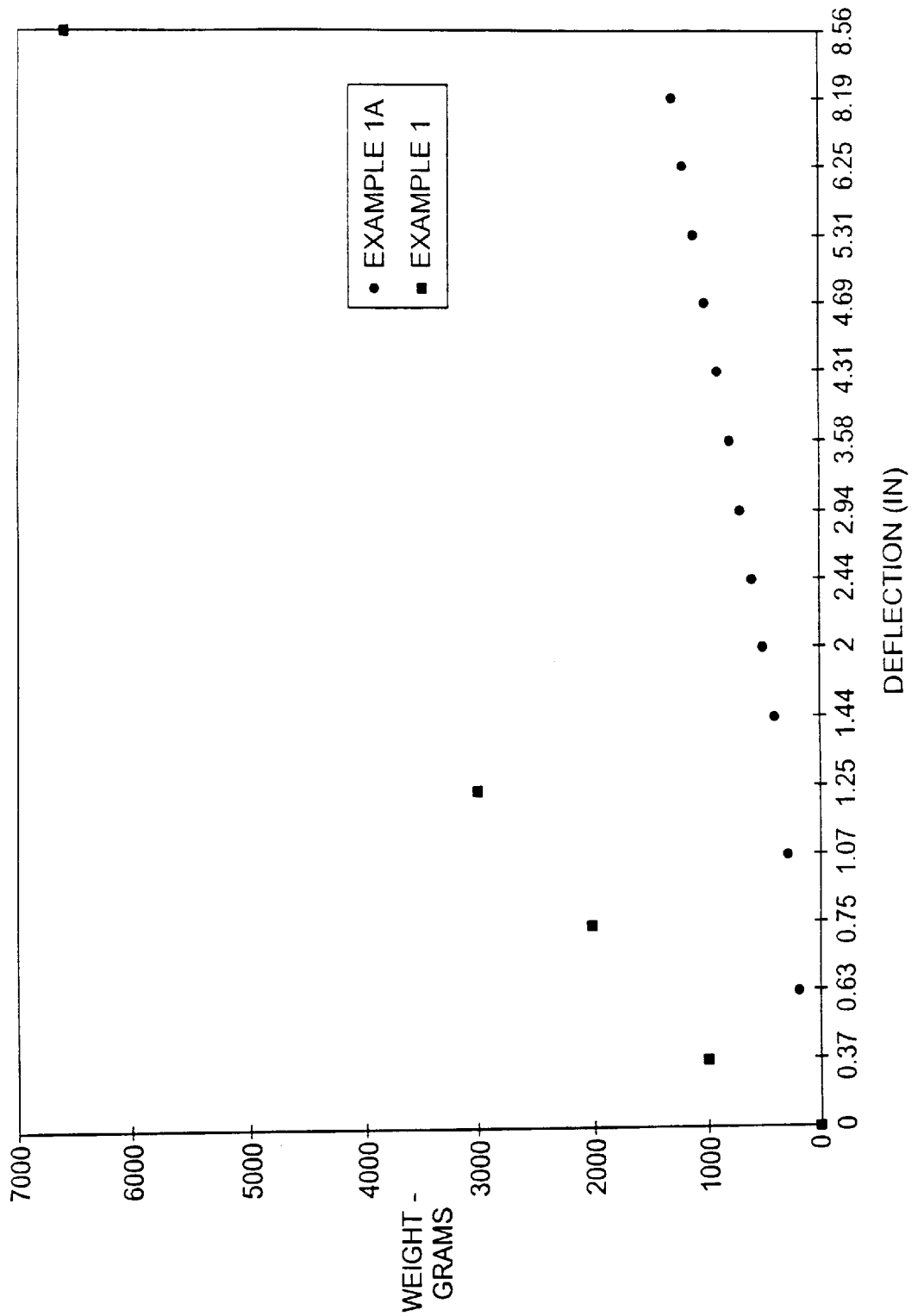
FIG. 4 is a graph depicting the bending stress curves for a low density foam core and a laminated foam structure having one higher density skin layer on each surface.
Figure 5:
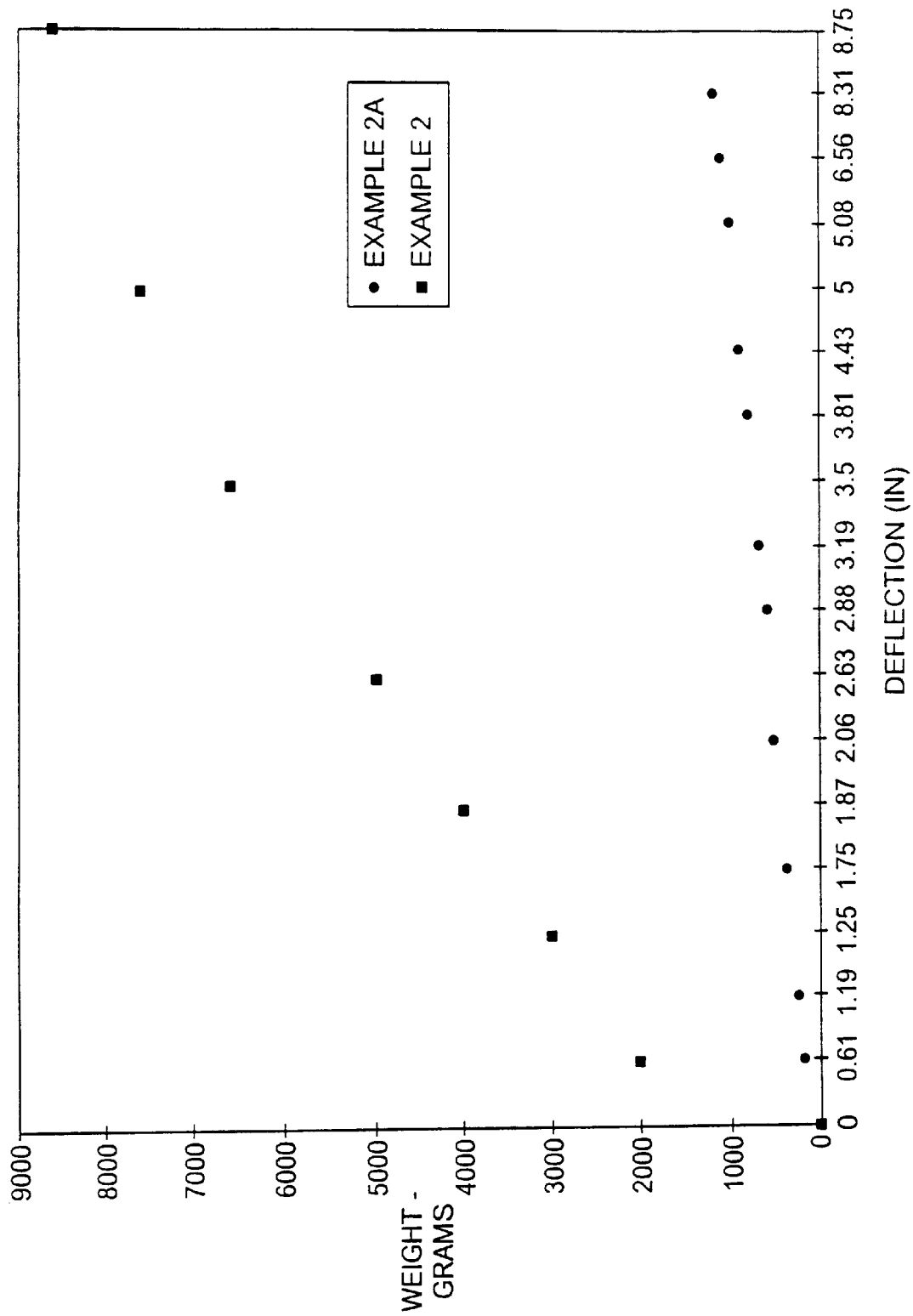
FIG. 5 is a graph depicting the bending stress curves for a low density foam core and a laminated foam structure having two higher density skin layers on each surface.

A foam laminate structure having four low density foam layers in a core and a two-layer higher density skin on each surface of the core can be manufactured using the following steps:
Step 1
A four-ply laminated foam core of 2 pcf, ½ inch thick polyethylene foam sheets is produced by the process of step 1 of Example 1 (hereafter referred to as Example 2A).
Step 2
A layer of 8 pcf polyethylene foam that is 3/16 inches thick is laminated to each side of the four-ply laminated foam core Example 2A by the process of step 2 and step 3 of Example 1 to afford an 8/2/8 laminated foam structure.
Step 3
A layer of 6 pcf polyethylene foam that is ⅛ inches thick is laminated to each side of the 8/2/8 laminated foam structure of step 2 by the process of step 2. The final laminated foam structure has a core of four laminated 2 pcf polyethylene foams with a skin of 8 pcf foam and an outer skin of 6 pcf foam on each side of the core with a total thickness of 2.25 inches (i.e., an 6/8/2/8/6 laminate, hereafter referred to as Example 2). Example 1 has a structure similar to that shown in FIG. 3.
Bending Test The flexural stiffness, or flexural strength, of the laminated foam structures were tested by bending a 36 inch length of the laminated foam structures Example 1 (the 8/1.7/8 laminate) and Example 2 (the 6/8/2/8/6 laminate). A 36 inch length of the corresponding core structures Example 1A (the 1.7 pcf core) and Example 2A (the 2 pcf core) at the same thicknesses was bent as a comparison. Beam bending tests are used in the plastics industry as a measure or stiffness. As an example, ASTM-D790 and ASTM-D229 are used extensively to evaluate the flexural modulus (i.e., flexural strength) of solid plastics. In our method, two point supports are located 36 inches apart on a solid horizontal surface. The midpoint of the supported length is determined. Successive weights are added to the midpoint in increments of 100 to 1000 grams, and the deflection is immediately measured. Stiffer materials are more resistant to bending and produce lower deflection. Deflection is measured in inches displaced from the straight beam position. The bending stress curves for Example 1A and Example 1 are shown in FIG. 4. The bending stress curves of Example 2A and Example 2 are shown in FIG. 5.

Generally, the laminated foam structures have much higher resistance to bending than the comparative core foams. Also, the uncut laminated foam structures (e.g., Example 1) do not crease when bent at angles up to 90 degrees. However, under the same conditions, the laminate without a higher density foam outer layer (e.g., Example 1A), creases on the surface. Example 2 is a suitable construction for use in a body board, for example. Suitable foams balance the stiffness and density properties for particular applications. The body board product should be as light as possible, affording the greatest flotation for its size (i.e., have the lower total density). The surfaces should resist abrasion (e.g., from sand) and resist absorption of water (i.e., it should be a closed cell foam). The board should be stiff enough to resist the mechanical forces imparted to the board during use (i.e., it should resist creasing). Buckling under ordinary use is undesirable, since this results in permanent damage which cannot be repaired.

EXAMPLE 3

A collapsible packaging system was prepared by die cutting a laminated foam structure. The core foam consisted of four laminated cross-linked polyethylene foam layers having a thickness of 0.530 inches and a density of 1.7 pcf taken from base roll stock. The layers were laminated using 1060° F. hot air and a compression roller nip. Following application of the hot air to the surfaces to be laminated, two foam sheets were forced together and padded through a cool roller nip, bonding the two surfaces together. This afforded a 2 ply laminate that was approximately 1 inch thick. The lamination procedure was repeated twice to afford a low density core having a density of approximately 2 pcf and a total thickness of about 2 inches. A skin was laminated to one surface of the core using the same procedure to produce the laminated foam structure (i.e., a 6/2/2/2 laminate) for use in a collapsible packaging system. The skin was a cross-linked polyethylene foam having a density of 6 pcf and a thickness of about ⅛ inch.

The collapsible packaging system was die cut from the laminated foam structure having a 2 pcf, 2 inch thick laminated core and a 6 pcf, ⅛ inch thick skin on one surface. The rule was 1.5 inches wide and had a serrated, center bevel profile. A ⅝ inch rule board exposed ⅞ inches of the rule for cutting. The press capacity was 100 tons. The die was configured to cut the laminated foam article in the form shown in FIGS. 7–15, which serves as a collapsible packaging system.

Other embodiments are within the claims.

What is claimed is:

1. A method of making a hinge comprising the steps of:
    providing a sheet including a skin laminated to a surface of a core;
    cutting through the core and the skin of the sheet to form a first hinged packing member and a base packing member;
    cutting through the core of the sheet and leaving the skin connected to the first hinged packing member to form a first hinged region, whereby the first hinged packing member can be pivoted about the hinge from a storage position in which the first hinged packing member is parallel to and contained with a gap in, the base packing member, to a packing position in which the first packing member is oriented transverse to the base packing member; the sheet being a laminated foam structure, the core including a first foam having an average foam density of between about 1 and 6 pounds per cubic foot and a thickness of between 1 and 14 inches, and the skin including a second foam having an average foam density of between about 3 and 18 pounds per cubic foot and a thickness less than 5/16 inch; and the first hinged packing member being tapered, having a wide end nearest to the first hinged region;
    cutting through the core and the skin of the sheet to form a second hinged packing member; and
    cutting through the core of the sheet and leaving the skin connected to the second hinged packing member and to the base packing member to form a second hinged region, whereby the second hinged packing member can be folded along the second hinged region, whereby in the storage position, both the first and the second hinged packing members are parallel to and positioned within the base packing member, and, in the packing position, the first and second hinged packing members are generally parallel, forming a well for containing a packed item in the base packing member.

2. The method of claim 1, wherein the first hinged packing member is tapered, having a wide end nearest to the first hinged region, and the second hinged packing member is tapered, having a wide end nearest to the second hinged region.

3. The method of claim 2, wherein the first packing member and the second hinged packing member are oriented so that the first hinged region and the second hinged region are located opposite to each other on the sheet.

4. The method of claim 1, wherein the first foam has an average foam density less than 3 pounds per cubic foot and the core thickness is between 1 and 5 inches.

5. The method of claim 1, wherein the second foam has an average foam density greater than 10 pounds per cubic inch and a thickness of between 1/16 and ⅛ inch.

6. The method of claim 1, wherein each of the foams comprises a polyolefin.

7. The method of claim 6, wherein the polyolefin includes a polyethylene or polypropylene.

8. The method of claim 1, wherein each of the foams further comprises a single-site initiated polyolefin resin.

9. The method of claim 1, wherein at least one of the foams is cross-linked.

10. The method of claim 1, wherein the laminated foam structure is heat laminated.

11. The method of claim 1 wherein the tapered wide end of the first packing member is generally trapazoidal.

* * * * *